(12) United States Patent
Strand

(10) Patent No.: US 12,540,506 B2
(45) Date of Patent: Feb. 3, 2026

(54) COVERING WITH MULTIPLE SHADE CONFIGURATIONS

(71) Applicant: Hunter Douglas Inc., Pearl River, NY (US)

(72) Inventor: Toralf Strand, San Diego, CA (US)

(73) Assignee: Hunter Douglas Inc., New York, NY (US)

(*) Notice: Subject to any disclaimer, the term of this patent is extended or adjusted under 35 U.S.C. 154(b) by 76 days.

(21) Appl. No.: 17/779,008

(22) PCT Filed: Nov. 23, 2020

(86) PCT No.: PCT/US2020/061724
§ 371 (c)(1),
(2) Date: May 23, 2022

(87) PCT Pub. No.: WO2021/108285
PCT Pub. Date: Jun. 3, 2021

(65) Prior Publication Data
US 2022/0412161 A1    Dec. 29, 2022

Related U.S. Application Data

(60) Provisional application No. 62/939,775, filed on Nov. 25, 2019.

(51) Int. Cl.
*E06B 9/44* (2006.01)
*E06B 9/68* (2006.01)
(Continued)

(52) U.S. Cl.
CPC ............. *E06B 9/44* (2013.01); *E06B 9/68* (2013.01); *E06B 2009/2405* (2013.01); *E06B 2009/405* (2013.01)

(58) Field of Classification Search
CPC ............. E06B 2009/405; E06B 9/42; E06B 2009/2447; E06B 2009/2458;
(Continued)

(56) References Cited

U.S. PATENT DOCUMENTS

| 1,803,883 A | 5/1931 | Weaver |
| 2,140,049 A | 12/1938 | Grauel |

(Continued)

FOREIGN PATENT DOCUMENTS

| CA | 2814265 A1 | 7/2013 |
| DE | 21511 C | 9/1882 |

(Continued)

OTHER PUBLICATIONS

Final Office Action issued in U.S. Appl. No. 16/719,309 dated Nov. 25, 2022 (16 pages).

(Continued)

*Primary Examiner* — Abe Massad
*Assistant Examiner* — Matthew R. Shepherd
(74) *Attorney, Agent, or Firm* — Dority & Manning, P.A.

(57) ABSTRACT

In one aspect, a covering for an architectural structure includes a multi-panel shade formed form a plurality of panel sections arranged relative to one another to form a continuous sheet, with at least one of the panel sections having different shade properties from the other panel section(s) forming the multi-panel shade. By adjusting the extent to which the panel sections are exposed along the drop length of the covering, the covering may be configured to provide various different shade configurations.

15 Claims, 18 Drawing Sheets

(51) Int. Cl.
  *E06B 9/24* (2006.01)
  *E06B 9/40* (2006.01)

(58) Field of Classification Search
  CPC ...... E06B 2009/2441; E06B 9/64; E06B 9/56;
   E06B 9/44; E06B 2009/2405
  See application file for complete search history.

(56) References Cited

U.S. PATENT DOCUMENTS

| | | | |
|---|---|---|---|
| 2,142,822 A | 1/1939 | Moore | |
| 2,281,022 A | 4/1942 | Cavanaugh | |
| 2,404,257 A | 7/1946 | Thomas | |
| 3,186,473 A | 6/1965 | Myers | |
| 3,265,116 A | 8/1966 | Guffan | |
| 3,789,904 A | 2/1974 | Takazawa | |
| 3,980,122 A | 9/1976 | Takazawa | |
| 4,273,099 A | 6/1981 | Morgan | |
| 4,418,739 A | 12/1983 | Woolnough et al. | |
| 4,813,198 A | 3/1989 | Johnston et al. | |
| 4,838,333 A * | 6/1989 | Mottura | E06B 9/80 192/12 B |
| 4,844,140 A * | 7/1989 | Jones | E06B 9/174 192/114 R |
| 4,869,308 A * | 9/1989 | Chang | E06B 9/307 160/176.1 R |
| 5,119,868 A * | 6/1992 | Werner | E06B 9/307 160/115 |
| 5,392,549 A | 2/1995 | Castro | |
| 5,467,266 A | 11/1995 | Jacobs | |
| 5,538,065 A | 7/1996 | Geraud | |
| 5,735,328 A | 4/1998 | Salhoff | |
| 6,189,592 B1 | 2/2001 | Domel | |
| 7,059,377 B2 | 6/2006 | Nein et al. | |
| 7,207,371 B2 | 4/2007 | Hsu | |
| 7,624,784 B2 | 12/2009 | Anthony | |
| 7,686,060 B2 | 3/2010 | Anthony | |
| 7,849,907 B2 | 12/2010 | Jang | |
| 8,002,341 B2 | 8/2011 | Hotta | |
| 8,020,602 B2 | 9/2011 | Smith et al. | |
| 8,146,646 B1 | 4/2012 | Toder | |
| 8,646,509 B2 | 2/2014 | Chu | |
| 8,820,386 B2 | 9/2014 | Mullet et al. | |
| 8,887,787 B2 | 11/2014 | Jang | |
| 8,959,835 B2 | 2/2015 | Drohan | |
| 9,022,090 B2 | 5/2015 | Cha | |
| 9,062,493 B2 | 6/2015 | Marocco | |
| 9,133,658 B2 | 9/2015 | Kuperus et al. | |
| 9,249,620 B2 | 2/2016 | Kim | |
| 9,334,687 B2 | 5/2016 | Jang | |
| 9,567,802 B2 | 2/2017 | Buccola et al. | |
| 9,677,331 B2 * | 6/2017 | Rupel | E06B 9/42 |
| 9,970,233 B2 | 5/2018 | Hsu et al. | |
| 10,017,984 B2 | 7/2018 | Marzilli et al. | |
| 10,041,295 B2 | 8/2018 | Veit | |
| 10,513,884 B2 | 12/2019 | Rupel et al. | |
| 11,208,842 B2 | 12/2021 | Kwon | |
| 2005/0051283 A1 | 3/2005 | Chatellard et al. | |
| 2005/0287295 A1 | 12/2005 | Papp | |
| 2006/0027339 A1 | 2/2006 | Hsu | |
| 2006/0272782 A1 * | 12/2006 | Nichols | E06B 9/44 160/120 |
| 2007/0084568 A1 | 4/2007 | Nien | |
| 2008/0271858 A1 | 11/2008 | Pon | |
| 2009/0120592 A1 * | 5/2009 | Lesperance | E06B 9/322 160/84.02 |
| 2009/0236050 A1 | 9/2009 | Marzilli | |
| 2009/0277593 A1 | 11/2009 | Stewart | |
| 2011/0209836 A1 * | 9/2011 | Yu | E06B 9/322 160/291 |
| 2014/0131502 A1 * | 5/2014 | Zhu | E06B 9/42 242/385.4 |
| 2014/0158314 A1 * | 6/2014 | Anderson | E06B 9/388 16/93 D |
| 2015/0376941 A1 | 12/2015 | Fujita et al. | |
| 2016/0319591 A1 | 11/2016 | Cheng | |
| 2017/0130526 A1 | 5/2017 | Gasparrini et al. | |
| 2017/0321481 A1 | 11/2017 | Ashkanmehr | |
| 2018/0171702 A1 * | 6/2018 | Hall | E06B 3/6722 |
| 2018/0171703 A1 | 6/2018 | Buccola, Jr. et al. | |
| 2018/0340369 A1 | 11/2018 | Goldberg | |
| 2019/0153777 A1 * | 5/2019 | Byun | E06B 9/42 |
| 2020/0123848 A1 | 4/2020 | Rupel et al. | |

FOREIGN PATENT DOCUMENTS

| | | |
|---|---|---|
| DE | 19833031 C1 | 2/2000 |
| DE | 202004016347 U1 | 2/2005 |
| DE | 202005012746 U1 | 11/2005 |
| DE | 202006000857 U1 | 4/2006 |
| DE | 202006004968 U1 | 6/2006 |
| DE | 202008001437 U1 | 4/2008 |
| DE | 202008011140 U1 | 10/2008 |
| EP | 1564362 B1 | 3/2008 |
| EP | 1522671 B1 | 2/2012 |
| EP | 2216490 B1 | 8/2014 |
| EP | 2867434 B1 | 10/2017 |
| FR | 1354192 A | 6/1964 |
| FR | 1366224 A | 7/1964 |
| FR | 2941736 B1 | 12/2016 |
| GB | 926663 A | 5/1963 |
| GB | 2219825 A | 12/1985 |
| GB | 2437734 B | 4/2008 |
| GB | 2445289 B | 11/2008 |
| JP | 4642339 B2 | 3/2011 |
| KR | 200398864 Y1 | 10/2005 |
| KR | 200444675 Y1 | 5/2009 |
| KR | 2012-0034007 A | 4/2012 |
| KR | 101131850 B1 | 4/2012 |
| KR | 101796935 B1 | 11/2017 |
| KR | 101831841 B1 | 2/2018 |
| WO | WO 2007/004852 A1 | 1/2007 |
| WO | WO2018131858 A1 | 7/2018 |

OTHER PUBLICATIONS

International Search Report and Written Opinion issued in PCT/US2020/061724 Dated Apr. 28, 2021 (18 pages).
https://www.luxaflex.co.uk/products/twist-shades/.
Non-Final Office Action issued in U.S. Appl. No. 16/713,309 dated Jun. 6, 2022 (9 pages).

* cited by examiner

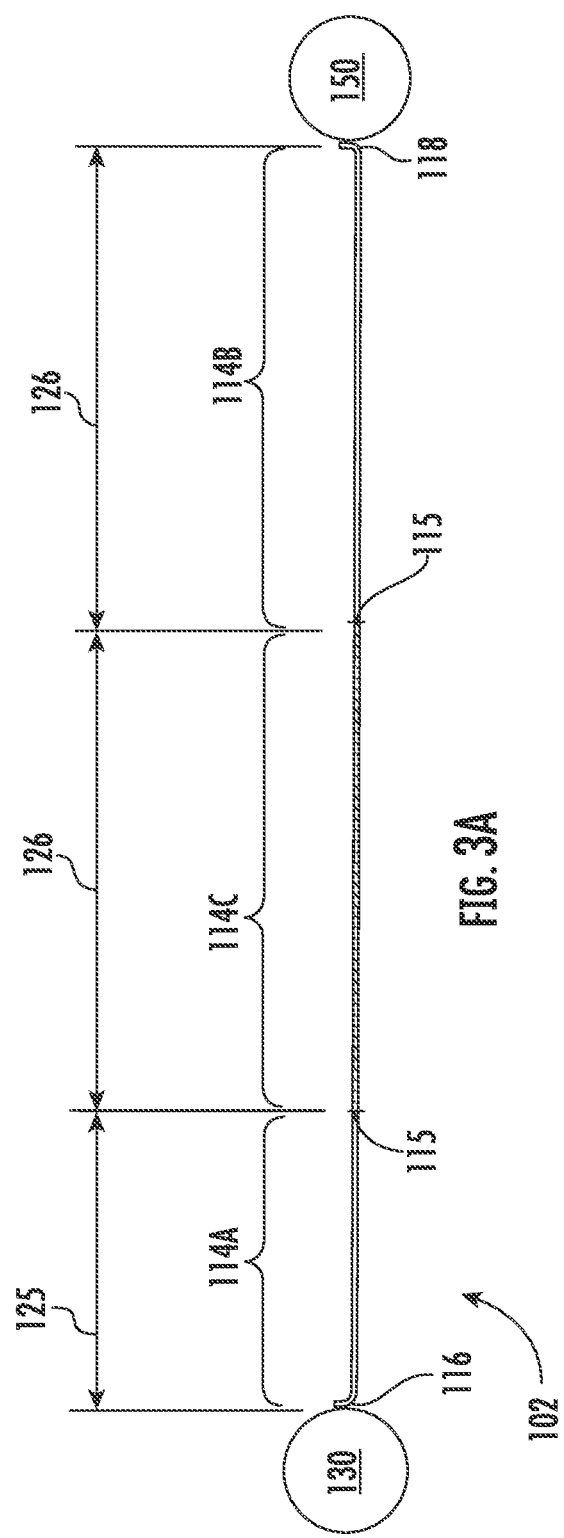
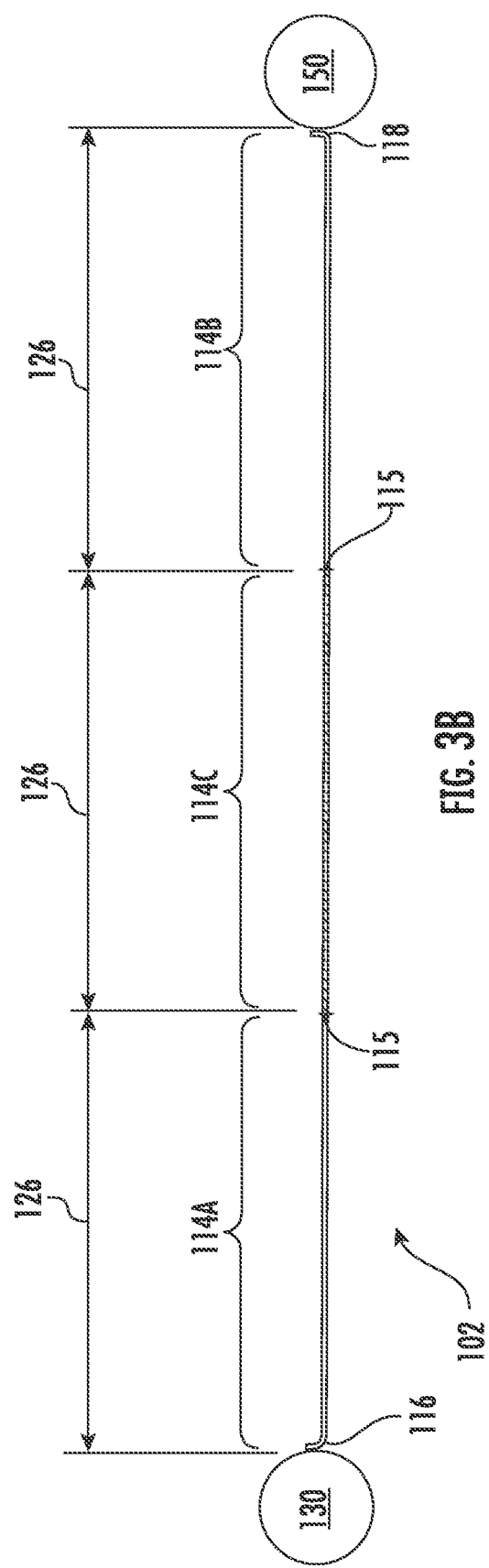

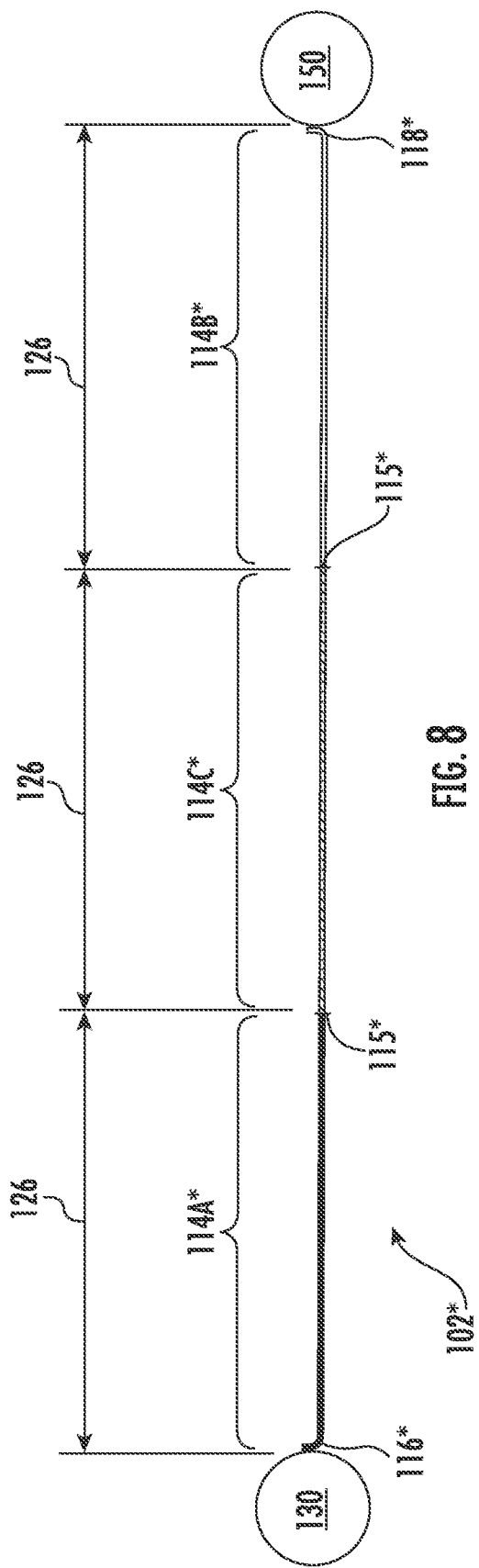

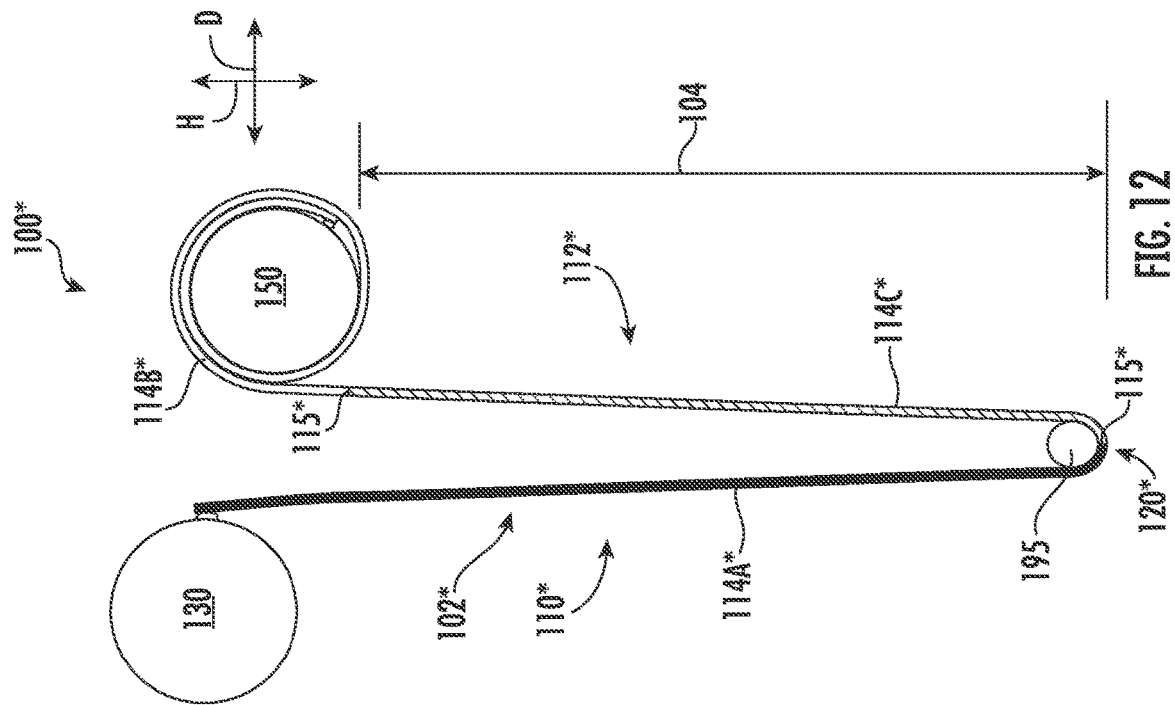
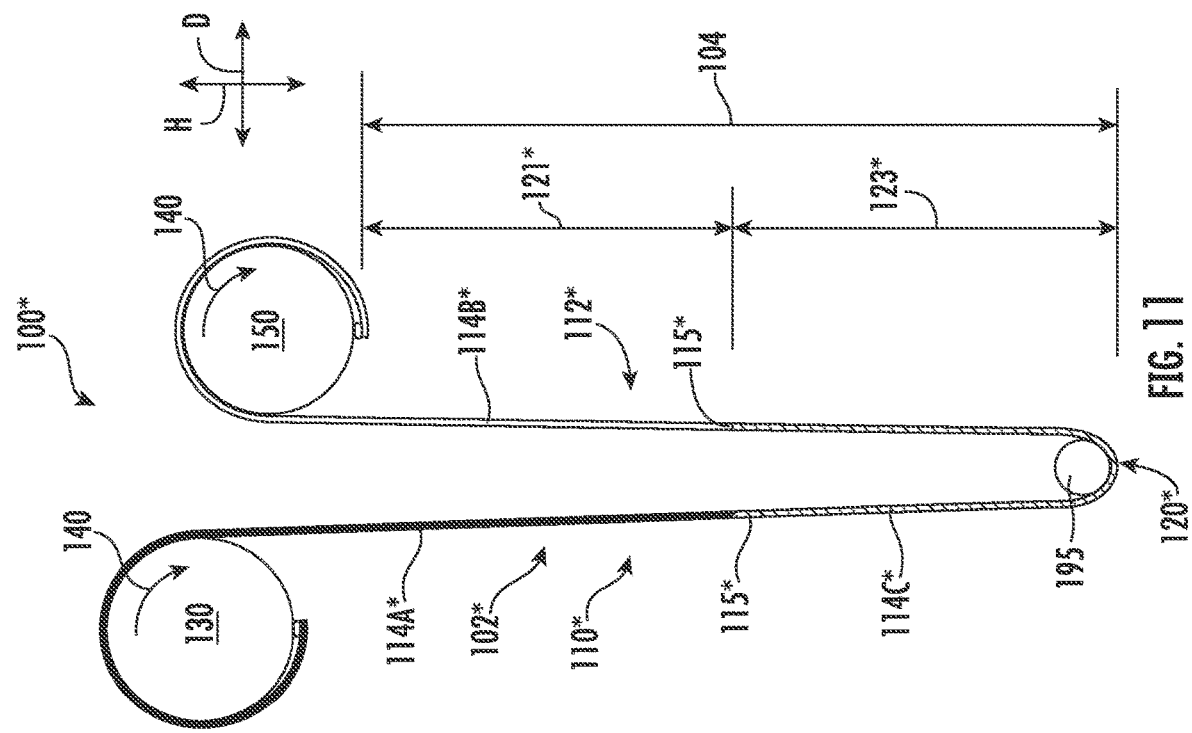

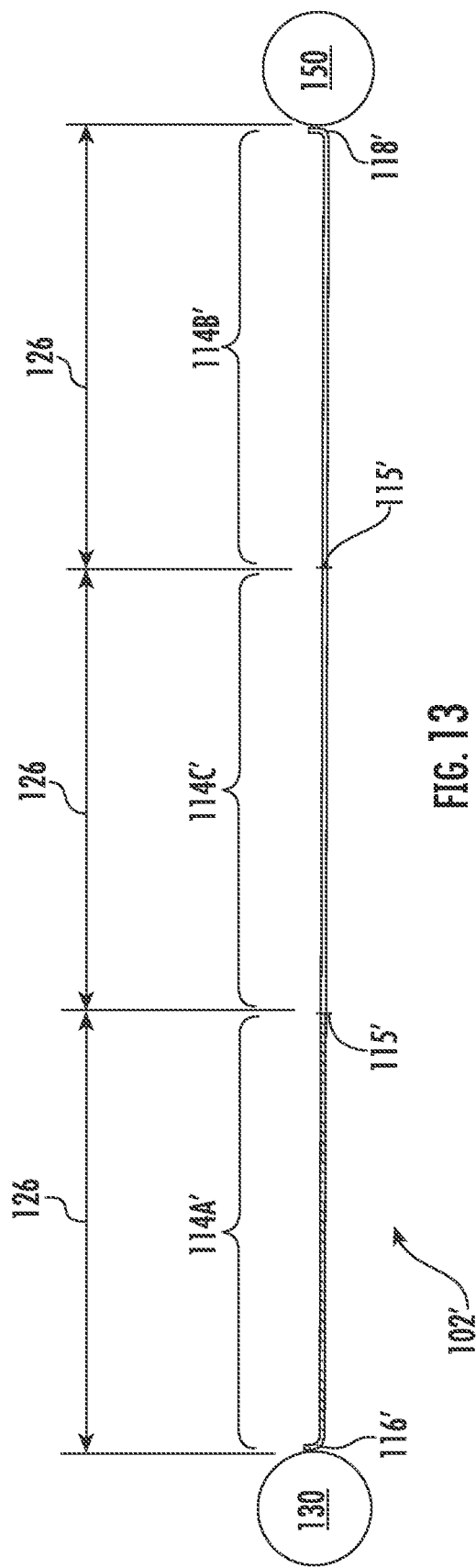

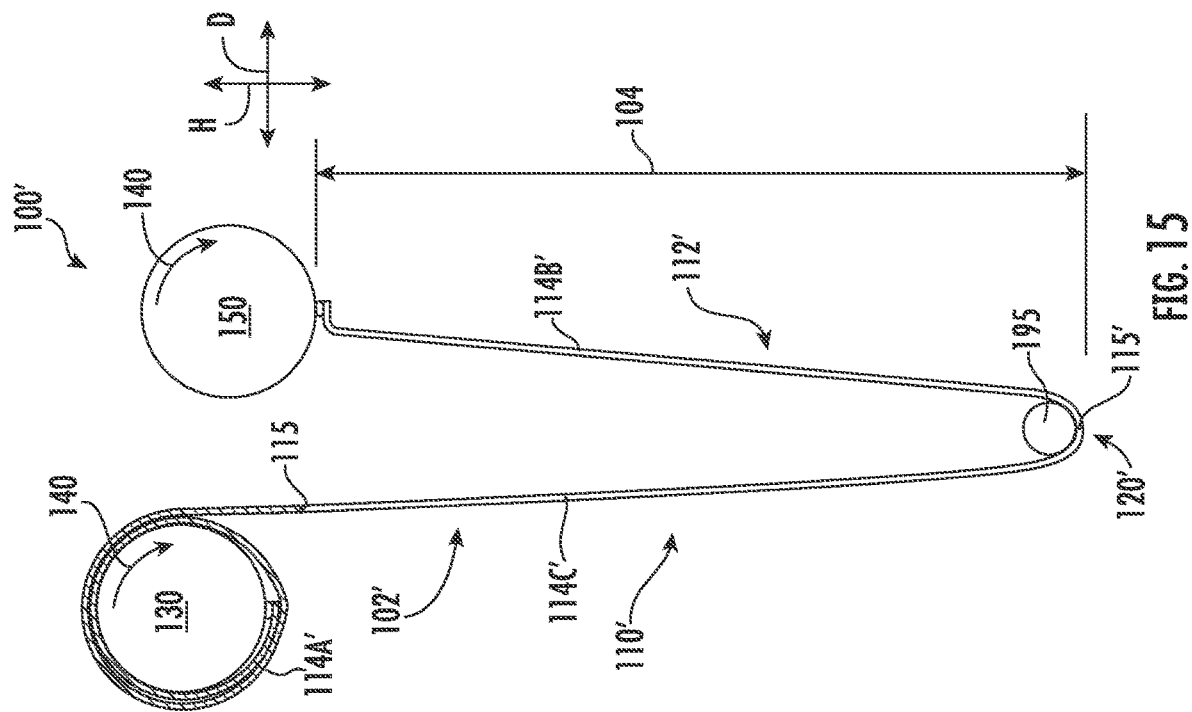
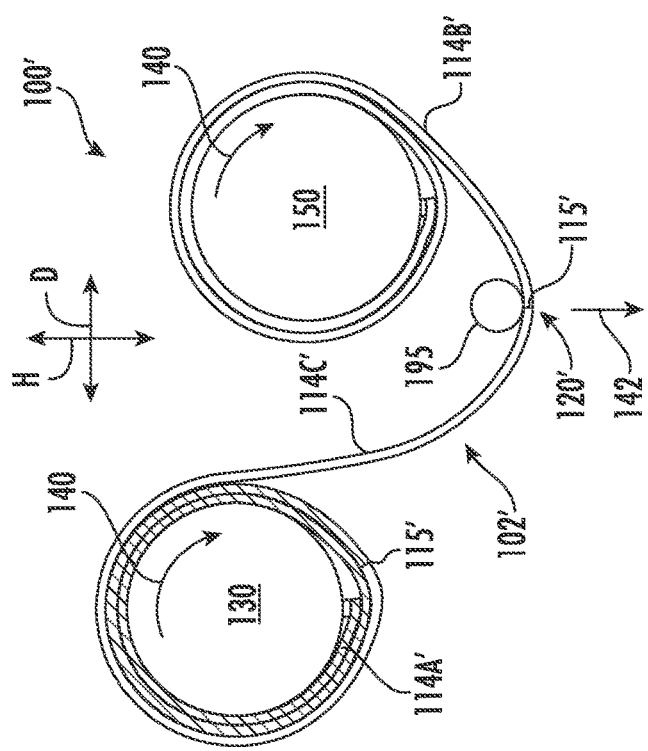

COVERING WITH MULTIPLE SHADE CONFIGURATIONS

CROSS-REFERENCE TO RELATED APPLICATIONS

The present application is based upon and claims the right of priority to U.S. Provisional Application No. 62/939,775, filed Nov. 25, 2019, the disclosure of which is hereby incorporated by reference herein in its entirety for all purposes.

FIELD

The present disclosure relates generally to coverings for architectural structures and, more particularly, to a covering, such as a roller shade, that is capable of providing multiple shade configurations.

BACKGROUND

Various different types of coverings exist for placement relative to architectural structures, such as windows, doors, archways, and the like. Such coverings include blinds and shades. Many shades, for instance, comprise a fabric covering that is placed in an architectural opening and includes a mounting assembly that not only mounts the shade within the opening, but also provides a control mechanism for raising and lowering the shade, as desired. For instance, the control mechanism may comprise a looped clutch or an electric motor.

Some shade assemblies include rollers that are rotatably mounted, usually in a horizontal orientation, across the top of the architectural structure. A shade material, such as a roller sheet shade, is attached to the roller. Rotating the roller in one direction causes the shade to extend in order to cover the architectural opening, and rotating the roller in the opposite direction causes the shade to retract so as to reveal the architectural opening.

Shade assemblies that include a rotating roller, often referred to as roller shades, are very popular with consumers. Roller shades, for instance, are easy to operate and are very compact, especially when the shade is in a fully retracted position. However, conventional roller shades are often only formed using a single type of shade material and thus, only provide a single shade configuration for covering the architectural structure within which the shade is installed. As a result, such roller shades significantly limit the ability of a consumer to customize the shade configuration of his/her roller shade based on desired aesthetics and/or desired lighting effects.

To address such limitations associated with conventional roller shades, zebra-type or banded roller shades have been introduced that include a roller sheet formed from alternating bands of differing materials, such as by alternating a transparent or sheer material and a light-blocking material along the length of the roller sheet. With such roller shades, the roller sheet typically extends between a first end coupled to a drive roller housed within the headrail and a second end coupled to either a portion of the headrail or a secondary roller housed within the headrail. In addition, the roller sheet is looped around an idling roller between its first and second ends such that the idling roller is suspended relative to the headrail via the roller shade. Such shades are generally configured to provide either a full light-blocking configuration (e.g., when the light-blocking bands in the front of the shade are aligned with the transparent/sheer bands in the rear of the shade) in which light is blocked across the entire length of the shade or an alternating zebra-type or striped configuration (e.g., when the light-blocking bands in the front of the shade are aligned with the light-blocking bands in the rear of the shade) in which the shade configuration alternates between a light-blocking configuration and a light-transmitting configuration along the length of the shade (thereby providing a banded or striped appearance along the shade). As a result, while zebra-type or banded roller shades provide some flexibility in allowing a customer to adjust the shade configuration of his/her shade, such adjustability is limited to either the full light-blocking configuration or the alternating zebra-type or striped configuration.

Accordingly, an improved covering that allows for multiple different shade configurations to be achieved would be welcomed in the technology.

BRIEF DESCRIPTION

Aspects and advantages of the present disclosure will be set forth in part in the following description, or may be obvious from the description, or may be learned through practice of the present disclosure.

In various aspects, the present disclosure is directed to a covering for an architectural structure, such as a window or door. In one embodiment, the covering includes a multi-panel shade having a plurality of panel sections arranged relative to one another to form a continuous sheet, with at least one of the panel sections having different shade properties than the other panel section(s) forming the multi-panel shade. By adjusting the extent to which the various panel sections are exposed along the drop length of the covering, the covering may be configured to provide various different shade configurations.

In another aspect, the present disclosure is directed to a clutch assembly and a related drive system for a covering. In one embodiment, the covering includes first and second rollers configured to be rotated to move the covering between a retracted position and an extended position. In such an embodiment, when the first and second rollers are rotationally coupled to each other to allow for simultaneous rotation of the rollers, the clutch assembly may be used to disengage or decouple the rollers from each other, thereby allowing one of the rollers to be rotated relative to the other roller.

These and other features, aspects and advantages of the present disclosure will become better understood with reference to the following Detailed Description and appended claims. The accompanying drawings, which are incorporated in and constitute a part of this specification, illustrate embodiments of the present disclosure and, together with the description, serve to explain the principles of the present disclosure.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 3A illustrates a schematic view of one embodiment of a multi-panel shade configured for use with the disclosed covering in accordance with aspects of the present disclosure, particularly illustrating the shade completely unwound from the rollers of the covering to show examples of the respective lengths of the various panel sections of the shade;

FIG. 3B illustrates a schematic view of an alternative embodiment of the multi-panel shade shown in FIG. 3A in accordance with aspects of the present disclosure;

FIG. 8 illustrates a schematic view of yet another embodiment of a multi-panel shade configured for use with the disclosed covering in accordance with aspects of the present disclosure, particularly illustrating the shade completely unwound from the rollers of the covering to show examples of the respective lengths of the various panel sections of the shade;

FIG. 11 illustrates yet another simplified, cross-sectional view of the covering shown in FIG. 9, particularly illustrating the covering after the multi-panel shade has been further unwound from and/or wound around the rollers from the position shown in FIG. 10 to adjust the shade configuration of the covering;

FIG. 12 illustrates a further simplified, cross-sectional view of the covering shown in FIG. 9, particularly illustrating the covering after the multi-panel shade has been further unwound from and/or wound around the rollers from the position shown in FIG. 11 to adjust the shade configuration of the covering;

FIG. 13 illustrates a schematic view of a further embodiment of a multi-panel shade configured for use with the disclosed covering in accordance with aspects of the present disclosure, particularly illustrating the shade completely unwound from the rollers of the covering to show examples of the respective lengths of the various panel sections of the shade;

FIG. 14 illustrates a simplified, cross-sectional view of the disclosed covering having an embodiment of a multi-shade panel as in FIG. 13 coupled to the rollers in accordance with aspects of the present disclosure, particularly illustrating the covering in the retracted position;

FIG. 15 illustrates another simplified, cross-sectional view of the covering shown in FIG. 14, particularly illustrating the covering after it has been initially moved to the extended position;

DETAILED DESCRIPTION

Figure 1:
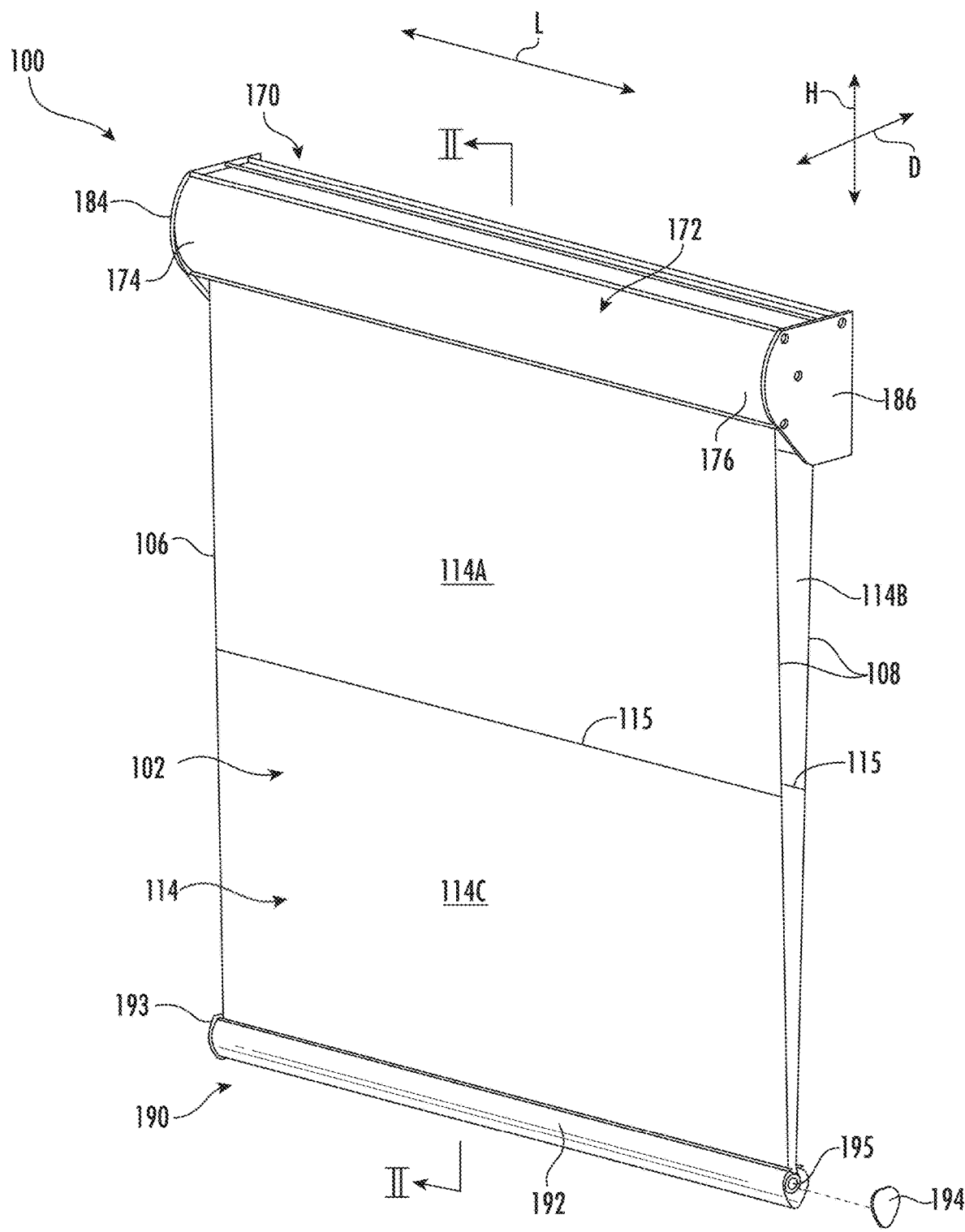
FIG. 1 illustrates a perspective view of one embodiment of a covering in accordance with aspects of the present disclosure.

In general, the present disclosure is directed to a covering that can be mounted relative to an architectural feature or structure (referred to herein simply as an architectural "structure" for the sake of convenience without intent to limit), such as a window or door, for blocking light, providing privacy, increasing the aesthetic appeal of a room, and/or allowing a desired amount of light into a room. Specifically, in several embodiments, the covering may correspond to a roller shade configured to provide two or more shade configurations, such as a fully transparent or semi-transparent shade configuration (e.g., a sheer shade configuration), an opaque shade configuration (e.g., a light filtering shade configuration and/or a black-out or room darkening shade configuration ("black-out" and "room darkening" materials and shade configurations being simply referred to herein as "room darkening" for the sake of convenience and without intent to limit), and/or a hybrid shade configuration (e.g., by providing a first shade configuration along a first vertical portion of the shade and a second shade configuration along the remainder of the drop length of the shade). In one embodiment, the various shade configurations may be achieved by providing a multi-panel shade having a plurality of panel sections, with at least one of the panel sections of the multi-panel shade having different shade properties than the other panel section(s) of the shade (e.g., by forming the panel sections from shade webs having different light transmission characteristics, differing degrees of visibility therethrough, differing levels or capabilities of thermal protection, etc.). Thus, by varying the extent to which the different panel sections are exposed along the drop length of the shade, the covering may be configured to provide different shade configurations.

In one aspect, the present disclosure is directed to a covering for an architectural structure that includes a first roller, a second roller spaced apart from the first roller, and a multi-panel shade configured to be moved between a retracted position and an extended position with rotation of the first and second rollers. The multi-panel shade includes a plurality of panel sections arranged relative to one another to form a continuous shade extending between a first end coupled to the first roller and a second end coupled to the second roller. In addition, the shade includes a looped end suspended below the first and second rollers when the multi-panel shade is in the extended position.

In one embodiment, the multi-panel shade includes a first panel section, a second panel section, and an intermediate panel section extending between the first and second panel sections, with at least one of the first panel section, the second panel section, or the intermediate panel section exhibiting a different shade property (e.g., a different light transmissivity or light transmission characteristic) than the remainder of the panel sections. In such an embodiment, when the multi-panel shade is in the extended position with portions of the first panel section, the second panel section, and the intermediate panel section exposed along the drop length of the shade, the covering provides a hybrid shade configuration in which a first vertical portion of the multi-panel shade extending along a given section of the drop length has a first shade configuration and a second vertical portion of the multi-panel shade extending along a remainder of the drop length has a second shade configuration that differs from the first shade configuration.

In one embodiment, the first vertical portion of the multi-panel shade corresponds to an upper vertical portion of the shade extending along an upper vertical portion of the drop length, and the second vertical portion of the multi-panel shade comprises a lower vertical portion of the shade extending along the remainder of the drop length. In such an embodiment, the summation of the respective vertical heights defined by the upper and lower vertical position will generally be substantially equal to the drop length of the shade.

In one embodiment, each of the panel sections has a section length that is equal to at least one-half or 50% of the drop length of the shade. In another embodiment, at least one of the panel sections has a section length that is substantially equal to the drop length of the shade. In a further embodiment, each of the panel sections has a section length that is substantially equal to the drop length of the shade.

As indicated above, the covering is configured to provide a hybrid shade configuration in which a first vertical portion of the multi-panel shade extending along a given section of the drop length has a first shade configuration and a second vertical portion of the multi-panel shade extending along a remainder of the drop length has a second shade configuration that differs from the first shade configuration. In one embodiment, the first shade configuration is one of a transparent shade configuration or a sheer shade configuration, and the second shade configuration is one of a light-filtering shade configuration or a room darkening shade configuration. In another embodiment, the first shade configuration one of a light-filtering shade configuration or a room darkening shade configuration, and the second shade configuration is the other of the light-filtering shade configuration or the room darkening shade configuration. In a further embodiment, the first shade configuration is one of a transparent shade configuration or a sheer shade configuration, and the second shade configuration is the other of the transparent shade configuration or the sheer shade configuration.

Additionally, in one embodiment, a shade web used to form at least one of the first panel section or the second panel section is selected to provide the first shade configuration of the hybrid shade configuration and a shade web used to form the intermediate panel section is selected to provide the second shade configuration of the hybrid shade configuration. For instance, in one embodiment, the shade web of at least one of the first panel section of the second panel section is formed from one of a transparent material, a sheer material, a light-blocking material, or a room darkening material, and the shade web of the intermediate panel section is formed from a different of a transparent material, a sheer material, a light-blocking material, or a room darkening material.

It should be appreciated that, as used herein, the term "web" generally refers to any material suitable for use within a covering, including, but not limited to, woven fabrics, non-woven fabrics, knitted fabrics, films, and/or laminations of any such material(s). In several embodiments, the webs may be flexible. A flexible web is formed from a material that is capable of being folded or flexed, such as woven, knitted, or non-woven fabrics; vinyl or film sheets; cords of natural or synthetic fibers; monofilaments; and the like.

In one embodiment, the covering is configured to provide the hybrid shade configuration when the intermediate panel section is looped around an idling roller of the covering from a first side of the shade to a second side of the shade such that a lower vertical portion of the drop length across which portions of the intermediate panel section extend provides a first shade configuration for the covering. Additionally, in such configuration of the embodiment, the covering provides a second shade configuration across an upper vertical portion of the multi-panel shade extending along the remainder of the drop length, with the first panel section extending across the upper vertical portion of the shade along the first side of the shade, and the second panel section extending across the upper vertical portion of the multi-panel shade along the second side of the multi-panel shade.

In another aspect, the present disclosure is directed to a covering for an architectural structure that includes a first roller, a second roller spaced apart from the first roller, and a drive arrangement coupling the first and second rollers together such that rotation of the first roller results in simultaneous rotation of the second roller. The covering also includes a shade configured to be moved between a retracted position and an extended position with rotation of the first and second rollers, and a clutch assembly provided in operative association with the drive arrangement. The clutch assembly is configured to disengage one of the first roller or the second roller from the drive arrangement to allow such roller to be rotated relative to the other roller.

In a further aspect, the present disclosure is directed to a drive system for a covering that includes a first roller rotatable about a first axis of rotation, a second roller rotatable about a second axis of rotation spaced apart from the first axis of rotation, and a drive arrangement coupling the first and second rollers together such that rotation of the first roller results in simultaneous rotation of the second roller. Additionally, the drive system includes a clutch assembly provided in operative association with the drive arrangement, with the clutch assembly being configured to disengage the first roller from the drive arrangement to allow the first roller to be rotated relative to the second roller.

In one embodiment, the clutch assembly includes a first clutch member coupled to the first roller for rotation therewith about the first axis of rotation, and a second clutch member movable relative to the first clutch member between a first position and a second position. Additionally, in one embodiment, when the second clutch member is in the first position, the clutch assembly provides a rotational coupling between the first roller and a drive member of the drive arrangement such that rotational motion is transmitted between the first roller and the drive arrangement via the clutch assembly to allow the drive arrangement to rotate the second roller simultaneously with the first roller. Moreover, in one embodiment, when the second clutch member is moved from the first position to the second position, the first roller is decoupled from the drive member to allow rotation of the first roller relative to the second roller.

It should also be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. Independent concepts can be used in any configuration as may be appreciated by one ordinary skill in the art. For instance, concepts or features illustrated or described as part of one embodiment can be used separately, or with another embodiment to yield a still further embodiment. Thus, it is intended that the present disclosure covers such modifications and variations as come within the scope of the appended claims and their equivalents.

Figure 2:
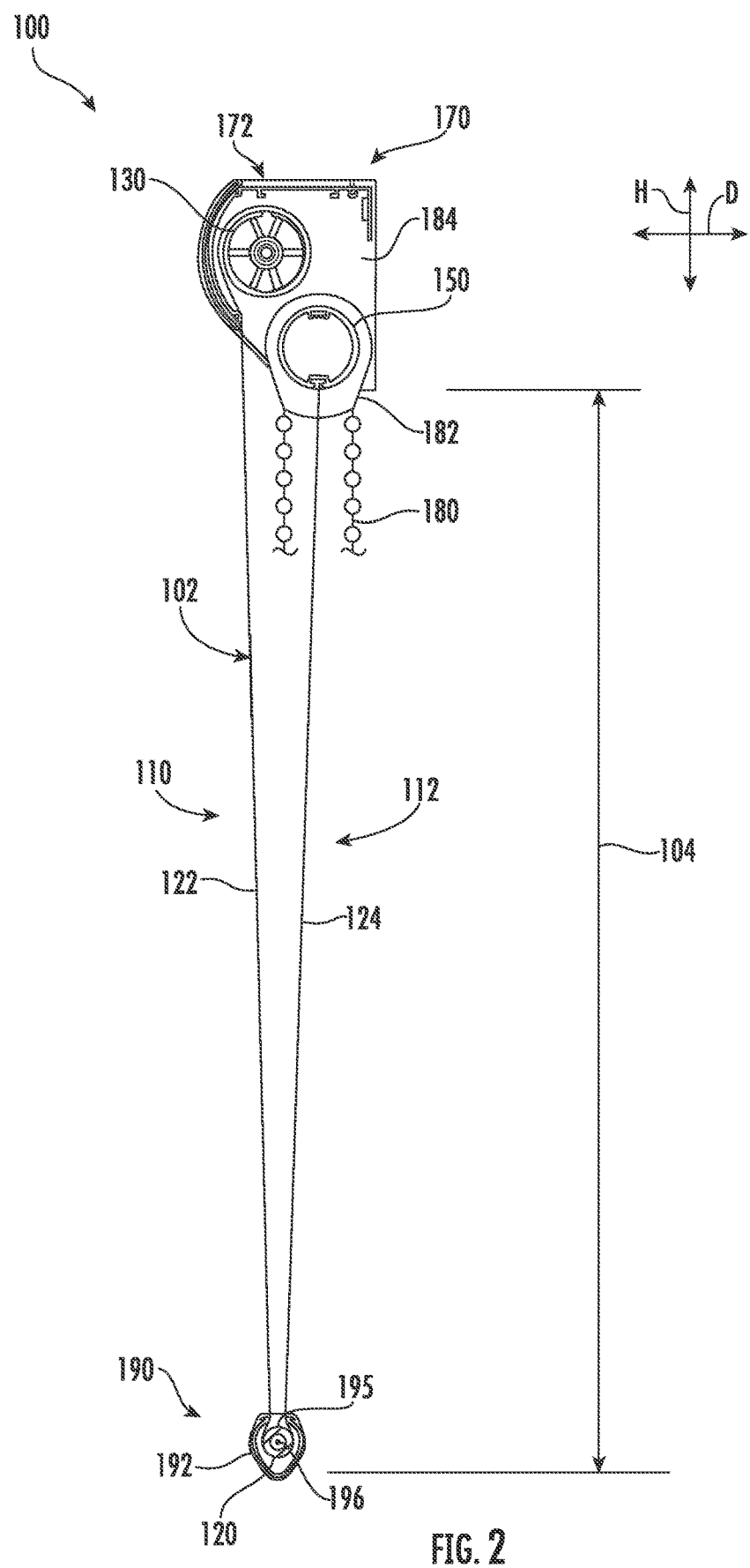
FIG. 2 illustrates a cross-sectional view of the covering shown in FIG. 1 taken about line II-II in accordance with aspects of the present disclosure.

Referring now to FIGS. 1 and 2, views of one illustrative embodiment of a covering 100 for an architectural structure (not shown) are illustrated in accordance with aspects of the present disclosure. In general, the covering 100 may be configured to be installed relative to a window, door, or any other suitable architectural structure as may be desired. In one embodiment, the covering 100 may be configured to be mounted relative to an architectural structure to allow the covering 100 to be suspended or supported relative to the architectural structure. It should be understood that the covering 100 is not limited in its particular use as a window or door shade, and may be used in any application as a covering, partition, shade, and/or the like, relative to and/or within any type of architectural structure.

In accordance with aspects of the present disclosure, the covering 100 is configured as a roller shade including a multi-panel shade 102 configured to be moved between an extended position (e.g., as shown in FIGS. 1 and 2) and a retracted position (not shown) via operation of associated rollers 130, 150 (FIG. 2) of the covering 100. In one embodiment, when lowered from the retracted position to the extended position, the shade 102 may be configured to cover the adjacent architectural structure. Similarly, in one embodiment, when raised from the extended position to the retracted position, the shade 102 may be configured to expose the adjacent architectural structure. It should be appreciated that the shade 102 may also be configured to be moved to any suitable intermediate position defined between the extended and retracted positions to allow the adjacent architectural structure to be only partially covered or exposed.

When in the extended position, the multi-panel shade 102 may generally extend in a vertical or heightwise direction of the covering (e.g., as indicated by arrow H in FIGS. 1 and 2) between a headrail assembly 170 of the covering 100 and an opposed bottom rail assembly 190 of the covering. For instance, when in the extended position, the multi-panel shade 102 may have a drop length 104 (FIG. 2) in the heightwise direction H of the covering 100. In addition, the multi-panel shade 102 may generally be configured to extend in a lateral direction of the covering (e.g., as indicated by arrow L in FIG. 1) between a first lateral end 106 (FIG. 1) and a second lateral end 108 (FIG. 1) of the shade 102, and in a depthwise direction of the covering (e.g., as indicated by arrow D in FIGS. 1 and 2) between a first side 110 (FIG. 2) and a second side 112 (FIG. 2) of the shade 102. As shown in FIG. 2, the first side 110 of the shade 102 is spaced apart from the second side 112 of the shade 102 in the depthwise direction D due to the looped configuration of the shade 102 (e.g., by being looped around an idling roller 195 of the bottom rail assembly 190) as will be described in greater detail below. It should be appreciated that the looped configuration of the shade 102 may provide insulative properties to the covering 100, as air can be trapped between the opposed sides 110, 112 of the shade 102. In addition, the insulative properties can be enhanced by providing side channels along the sides of the adjacent architectural structure (e.g., the sides of the adjacent window frame) that receive the lateral ends 106, 108 of the shade 102, thereby increasing the ability to trap air between the opposed sides 110, 112 of the shade 102.

In several embodiments, the multi-panel shade 102 may include two or more distinct panel sections 114 arranged relative to one another to form a continuous shade. For instance, in the illustrated example of FIG. 1, the shade 102 includes three distinct panel sections 114, namely a first panel section 114A, a second panel section 114B, and a third or intermediate panel section 114C. As will be described in greater detail below, at least one of the panel sections 114 forming the multi-panel shade 102 may exhibit or have different shade properties than the other panel section(s) 114 forming the multi-panel shade 102, thereby allowing the covering 100 to provide different shade configurations depending on the extent to which the various panel sections 114 are exposed along the drop length 104 defined between the headrail and bottom rail assemblies 170, 190. For instance, the various panel sections 114 may be formed from shade webs having different light transmission characteristics, varying degrees of visibility therethrough, and/or different thermal protection capabilities to allow the disclosed covering 100 to provide multiple shade configurations.

As indicated above, the shade 102 may be configured to be extended and retracted via operation of associated rollers 130, 150 of the covering 100. For example, as particularly shown in the cross-sectional view of FIG. 2, the covering 100 includes a pair of upper rollers 130, 150 operatively associated with the multi-panel shade 102, namely a first roller 130 and a second roller 150. As will be described below, a first end (e.g., end 116 shown in FIGS. 3A and 3B) of the multi-panel shade 102 is configured to be coupled to the first roller 130 while an opposed second end (e.g., end 118 shown in FIGS. 3A and 3B) of the shade 102 is configured to be coupled to the second roller 150. Accordingly, by rotating the rollers 130, 150, the shade 102 may be moved between the retracted and extended positions. Moreover, as will be described in greater detail below, when in the extended position, further simultaneous rotation of both rollers 130, 150 may allow for the shade configuration of the covering 100 to be adjusted by adjusting the relative positioning of the panel sections 114 and by varying which and to what extent the panel sections 114 of the shade 102 are exposed along the drop length 104. In addition, when in the extended position, rotation of one of the rollers 130, 150 relative to the other may allow for the drop length 104 of the shade 102 to be adjusted, as desired.

Referring now to FIG. 3A, a schematic view of one embodiment of the multi-panel shade 102 described above is illustrated in accordance with aspects of the present disclosure, particularly illustrating the shade 102 completely unwound from the rollers 130, 150 to show examples of the respective lengths of the various panel sections 114 of the shade 102. As shown in FIG. 3A, the shade 102 extends lengthwise between a first end 116 coupled to the first roller 130 and a second end 118 coupled to the second roller 150. Additionally, as described above, the shade 102 includes three distinct panel sections 114 arranged relative to one another (e.g., at panel-to-panel-interfaces 115) between the opposed ends 116, 118 of the shade 102. Specifically, the shade 102 includes a first panel section 114A, a second panel section 114B, and a third or intermediate panel section 114C, with the first panel section 114A extending between the first end 116 of the shade 102 and the intermediate panel section 114C and the second panel section 114B extending between the intermediate panel section 114C and the second end 118 of the shade 102 such that the intermediate panel section 114C separates the first panel section 114A from the second panel section 114B. It should be appreciated that, as an alternative to including three panel sections 114, the multi-panel shade 102 may be configured to include any other suitable number of panel sections 114, such as two panel sections or four or more panel sections.

Additionally, in accordance with aspects of the present disclosure, at least one of the panel sections 114 may have shade properties that differ from the shade properties of the other panel section(s) 114 forming the multi-panel shade 102. Specifically, in several embodiments, at least one of the panel sections 114 may be configured to exhibit a different light transmissivity or light transmission characteristic than the other panel section(s) 114, such as by forming at least one of the panel sections 114 from a different shade web or different weave configuration than the other panel section(s) 114 that allows more or less light transmission therethrough. As a result, by carefully selecting the arrangement or order of the panel sections 114 along the length of the shade 102, the covering 100 may be configured to provide different shade configurations with rotation of the rollers 130, 150 as the various panel sections 114 are exposed in different combinations and/or along different extents across the drop length 104 of the covering 100. It should be appreciated that, although the panel sections 114 will generally be described herein as having different light transmission characteristics to allow the covering 100 to provide different shade configurations, another shade property (e.g., visibility, thermal capabilities, etc.) may, instead, be differed between the panel sections 114 to provide different shade configurations for the disclosed covering 100.

For instance, FIG. 3A illustrates an example embodiment of a panel section arrangement for the multi-panel shade 102 that allows the disclosed covering 100 to provide a specific combination of shade configurations based on the relative positioning of the panel sections 114 along the drop length 104 of the covering 100. Specifically, in the illustrated example of FIG. 3A, the outer panel sections (i.e., the first and second panel sections 114A, 114B) are formed from a transparent or a sheer material (e.g., as indicated by the lack of cross-hatching along such panel sections 114A, 114B), while the intermediate panel section 114C is formed from a more opaque material, such as a light-filtering material or a room darkening material (e.g., as indicated by the cross-hatching along such panel section 114C). For instance, in one embodiment, both the first and second panel sections 114A, 114B may be made from the same type of material (e.g., transparent, sheer, etc.), such as by forming both panel sections 114A, 114B from a transparent material (e.g., a transparent film) or by forming both panel sections 114A, 114B from a sheer material. Alternatively, the first and second panel sections 114A, 114B may be made from different types of material (e.g., transparent, sheer, etc.), such as by forming one of the panel sections from a transparent material (e.g., a transparent film) and the other panel section from a sheer material. It should be appreciated that, when forming both the first and second panel sections 114A, 114B from a sheer material (or a transparent material), different sheer materials (or different transparent materials) may be used to form the first and second panel sections 114A, 114B. For instance, when forming both the first and second panel sections 114A, 114B from a sheer material, it may be desirable to utilize different sheer materials for the first and second panel sections 114A, 114B prevent the occurrence of any moire effects.

It should be appreciated that the various panel sections 114 may be configured to be arranged relative to one another in any suitable manner that allows a continuous shade 102 to be formed having distinct or identifiable panel sections 114. For instance, in one embodiment, each panel section 114 may be formed from a separate shade web. In such an embodiment, the various panel sections 114 may be coupled together (e.g., end-to-end) at the panel-to-panel interfaces 115 using any suitable attachment means and/or methodology generally known in the art for coupling different shade webs to one another. For instance, adjacent ends of the panel sections 114 may be coupled together at the panel-to-panel interfaces 115 using adhesives, fasteners, via welding (e.g., ultrasonic or heat welding), by sewing the panel sections 114 together, and/or using any other suitable attachment means and/or methodology. Alternatively, the shade 102 may be manufactured as a single continuous shade panel, with the various panel sections 114 being formed as a result of different weave patterns or other suitable panel formation techniques along the length of the shade. For instance, the shade 102 may be manufactured with a continuous warp yarn along the length of the shade 102, with the weft yarn being varied (or added, as necessary) across one or more of the panel sections (e.g., from one panel-to-panel-interface 115 to the adjacent panel-to-panel-interface 115) to allow for the shade properties (e.g., the light transmission characteristics) of the panel sections 114 to differ, as desired.

In several embodiments, each panel section 114 has a section length. In one embodiment, each panel section 114 may have a section length 126 that is substantially equal to at least one-half or 50% of the desired drop length 104 (FIG. 2) of the covering 100. For example, as shown in FIG. 3A, the first panel section 114A has a section length 125 that is substantially equal to one-half or 50% of the desired drop length 104, such as by configuring first panel section 114A to have a section length 125 that is equal to a length ranging from about 40% to about 60% the desired drop length 104 or ranging from about 45% to about 55% of the desired drop length 104 or ranging from about 48% to about 52% of the desired drop length 104 and/or any other subranges defined therebetween. Additionally, in the embodiment of FIG. 3A, each of the second and intermediate panel sections 114B, 114C has a section length 126 that is substantially equal to the desired drop length 104 of the covering 100, such as by configuring each of such panel sections 114B, 114C to have a section length 126 that is equal to a length ranging from plus or minus 10% of the desired drop length 104 or ranging from plus or minus 5% of the desired drop length 104 or ranging from plus or minus 2% of the desired drop length 104 and/or any other subranges defined therebetween. In such an embodiment, the overall length of the shade 102 may generally be substantially equal to two and a half times the desired drop length 104 of the covering 100.

Alternatively, each panel section 114 may be configured to have any other suitable section length, including configuring the various panel sections 114 to have substantially equal section lengths. For instance, FIG. 3B illustrates an alternative embodiment of the shade arrangement shown in FIG. 3A in which the first panel section 114A has been re-configured to have a section length 126 that is equal or substantially equal to the section lengths 126 of the other panel sections 114B, 114C. Specifically, in the illustrated example of FIG. 3B, each panel section 114 has a section length 126 that is substantially equal to the desired drop length 104 of the covering 100, such as by configuring each panel section 114 to have a section length 126 that is equal to a length ranging from plus or minus 10% of the desired drop length 104 or ranging from plus or minus 5% of the desired drop length 104 or ranging from plus or minus 2% of the desired drop length 104 and/or any other subranges defined therebetween. In such an embodiment, the overall length of the shade 102 may generally be substantially equal to three times the desired drop length 104 of the covering 100. In another embodiment, each of the panel sections 114 may have any other suitable section length, such as a section length ranging from 50% of the desired drop length 104 to 100% of the desired drop length 104.

Figure 5:
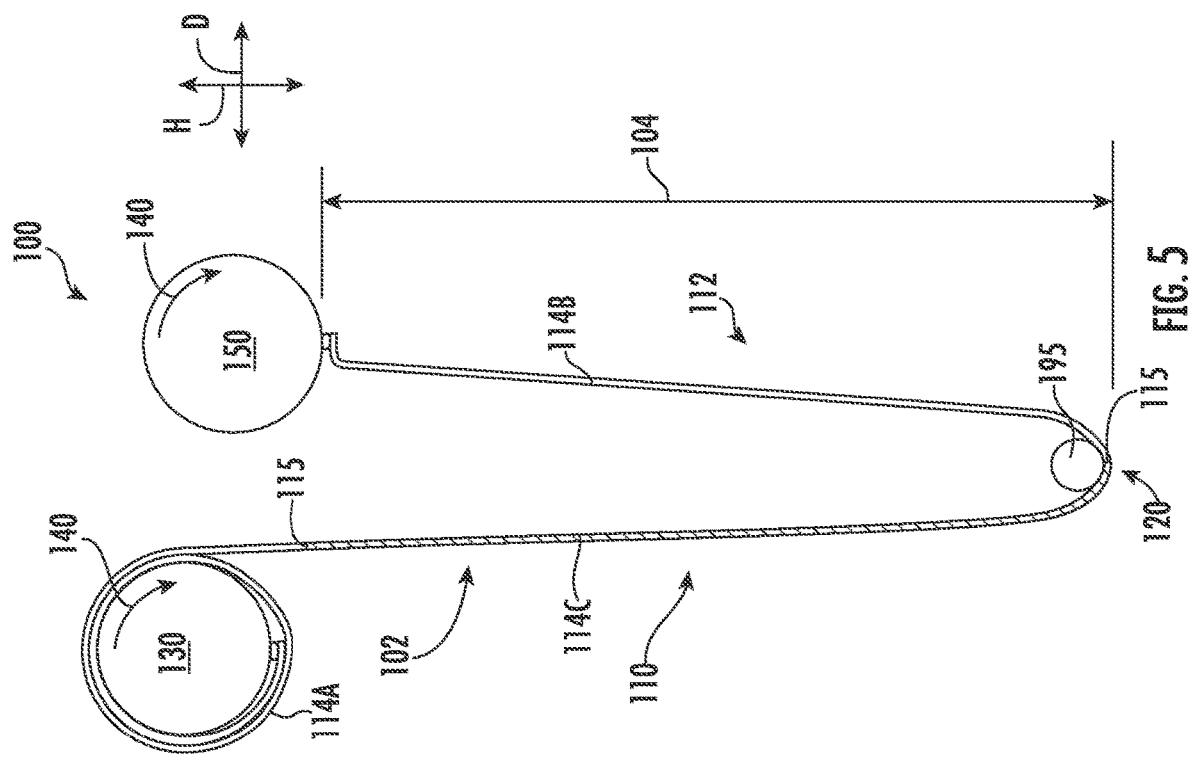
FIG. 5 illustrates another simplified, cross-sectional view of the covering shown in FIG. 4, particularly illustrating the covering after it has been initially moved to the extended position.
Figure 4:
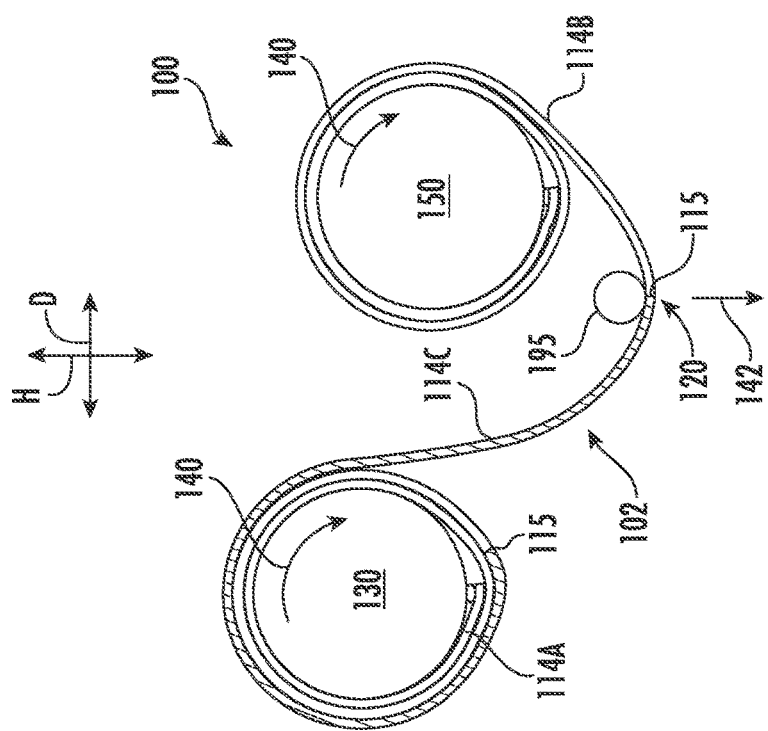
FIG. 4 illustrates a simplified, cross-sectional view of the disclosed covering having an embodiment of a multi-shade panel as in FIG. 3A coupled to the rollers in accordance with aspects of the present disclosure, particularly illustrating the covering in the retracted position.
Figure 6:
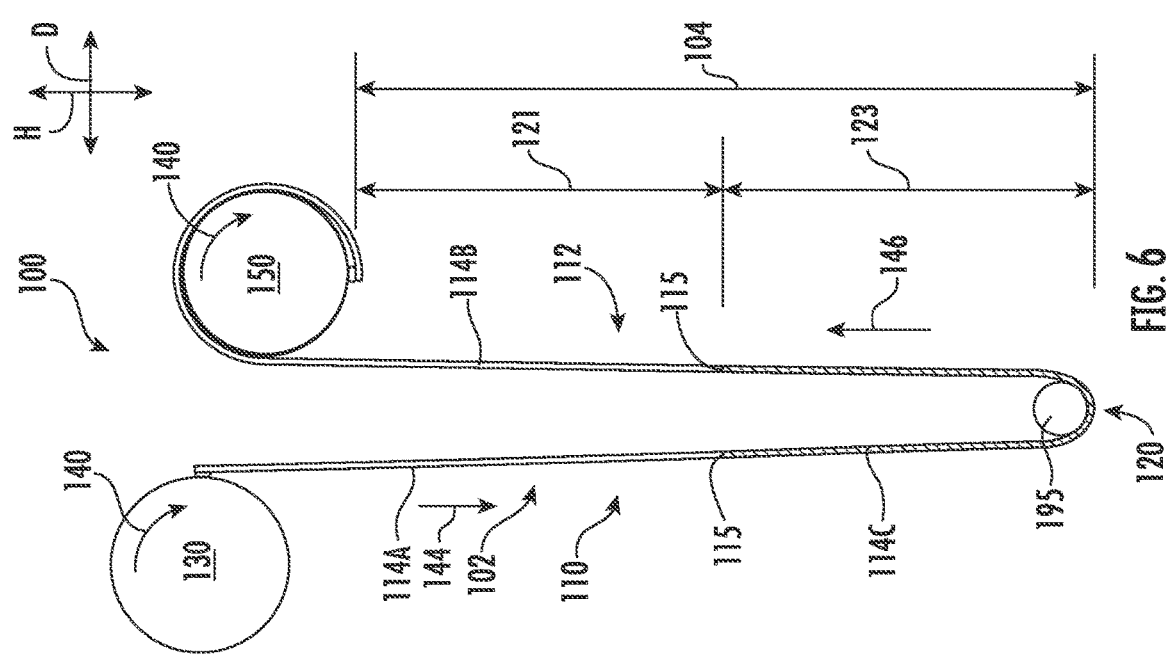
FIG. 6 illustrates yet another simplified, cross-sectional view of the covering shown in FIG. 4, particularly illustrating the covering after the multi-panel shade has been further unwound from and/or wound around the rollers from the position shown in FIG. 5 to adjust the shade configuration of the covering.

Referring now to FIGS. 4-6, various cross-sectional, simplified views of the covering 100 described above are illustrated in accordance with aspects of the present disclosure, particularly illustrating the embodiment of the multi-panel shade 102 shown in FIG. 3A with the panel sections 114 in various wound/unwound states or positions relative to the first and second rollers 130, 150. Specifically, FIGS. 4-6 illustrate a time-ordered progression of the multi-panel shade 102 as the shade 102 is moved from the fully retracted position (FIG. 4) to an extended position (e.g., the fully extended position of FIG. 5) and as the shade 102 is subsequently moved between the rollers 130, 150 while in the extended position to adjust the shade configuration of the covering (FIG. 6).

As shown in FIG. 4, when in the retracted position, the shade 102 is configured to be primarily wound around the first and second rollers 130, 150. As will be described below, in a particular embodiment of the present disclosure, the portion of the shade 102 that is wound around one of the rollers (e.g., the first roller 130) when the covering 100 is in the retracted position may be equal to approximately one and half to two times the portion of the shade 102 that is wound around the other roller (e.g., the second roller 150). For instance, in the illustrated example of FIG. 4, the first and intermediate panel sections 114A, 114C are substantially wound around the first roller 130, while the second panel section 114B is substantially wound around the second roller 150 when the covering 100 is in the retracted position. Additionally, as shown in FIG. 4, a looped portion of the shade 102 is suspended from the rollers 130, 150 to support the bottom rail assembly 190 (only the idling roller 195 being shown in FIGS. 4-6 for purposes of illustration). Specifically, as shown in FIG. 4, the looped portion of the shade 102 is configured to form a cradle or looped end 120 that wraps around the idling roller 195 of the bottom rail assembly 190 (FIGS. 1 and 2), thereby supporting the bottom rail assembly 190 relative to the first and second rollers 130, 150. In the illustrated example of FIG. 4, the panel-to-panel interface 115 defined between the intermediate panel section 114C and the second panel section 114B is located at or adjacent to the looped end 120 of the shade 102 when the covering 100 is in the retracted position.

As shown in FIGS. 4 and 5, to move the shade 102 from the retracted position to the extended position, the first and second rollers 130, 150 may be rotated in a given direction (e.g., as indicated by arrow 140 shown in FIGS. 4 and 5) such that the shade 102 is simultaneously unwound from both rollers 130, 150. As a result, the looped-end 120 of the shade 102 (and, thus, the bottom rail assembly 190 (FIG. 1)) may be lowered (e.g., in the direction of arrow 142 shown in FIG. 4) away from the rollers 130, 150 until the shade 102 reaches the extended position and, thus, has the desired drop length 104 (FIG. 5). For purposes of discussion, the first and second rollers 130, 150 will be described herein as being rotated in the same direction (e.g., rotational direction 140 shown in FIGS. 4 and 5). However, in other embodiments, the first and second rollers 130, 150 may be counter-rotated (e.g., by being rotated in opposite directions). Such counter-rotation of the first and second rollers 130, 150 may, in certain instances, allow the front-to-rear movement of the shade 102 (e.g., in the depthwise direction D) to be reduced as the shade 102 is moved between the extended and retracted positions. As will be described below, the specific rotational direction of each roller 130, 150 may vary, for example, based on the type of drive arrangement used within the covering 100 (e.g., an indirect vs. direct gear drive arrangement).

As shown in FIG. 5, upon reaching the fully extended position, the intermediate panel section 114C has been substantially or completely unwound from the first roller 130 such that the intermediate panel section 114C generally spans the drop length 104 along the first side 110 of the shade 102. Similarly, as shown in FIG. 5, the second panel section 114B has been substantially or completely unwound from the second roller 150 such that the second panel section 114B generally spans the drop length 104 along the second side 112 of the shade 102. With the intermediate and second panel sections 114C, 114B being exposed along the drop length 104 of the shade 102 in the manner shown in FIG. 5, the covering 100 may have a first shade configuration generally defined by the dominant light transmission characteristic between the exposed panel sections 114C, 114B. For instance, in the illustrated example of FIG. 5, the intermediate panel section 114C is formed from a light-filtering material or room darkening material, while the second panel section 114B is formed from a transparent or sheer material. As such, in the position shown in FIG. 5, the covering 100 will generally provide a full light-filtering or room darkening shade configuration along the entirety of the drop length 104 of the shade 102, thereby providing, for example, increased privacy and desired light blocking or filtering.

As indicated above with reference to FIG. 3A, each of the intermediate and second panel sections 114C, 114B may, in one embodiment, have a section length 126 (FIG. 3A) that is substantially equal to the desired drop length 104 of the shade 102. In such an embodiment, as shown in FIG. 5, these panel sections 114C, 114B may be configured to be completely unwound from their respective rollers 130, 150 when the shade 102 is moved to the extended position. As such, any further rotation of the first roller 130 in the rotational direction 140 will result in the first panel section 114A being unwound from the first roller 130, while any further rotation of the second roller 150 in the rotational direction 140 will result in the second panel section 114B being re-wound around the second roller 150.

For instance, as shown in FIG. 6, continued rotation of the rollers 130, 150 in the rotational direction 140 results in the first panel section 114A being unwound from the first roller 130 as the second panel section 114B is being simultaneously re-wound around the second roller 150 in an opposite winding direction to the initial winding direction for the second roller 150. Specifically, as shown in FIG. 6, such unwinding of the first panel section 114A results in downward movement of the first panel section 114A along the first side 110 of the shade 102 (as indicated by arrow 144), while such re-winding of the second panel section 114B results in upward movement of second panel section 114B along the second side 112 of the shade 102 (as indicated by arrow 146). As a result, the intermediate panel section 114C begins to loop around the idling roller 195 such that portions of the intermediate panel section 114C extend along both the first side 110 and the second side 112 of the shade 102.

The exposure of the first panel section 114A along the first side 110 of the shade 102 while the intermediate panel section 114C is looping around the idling roller 195 results in a hybrid shade configuration, with two different shade configurations being provided along two separate vertical extents or portions of the shade 102. With such exposure of all three panel sections 114A, 114B, 114C along the drop length 104 of the shade 102, the covering 100 may provide both a first shade configuration along an upper vertical portion 121 of the shade 102 across which the first and second panel sections 114A, 114B are aligned in the depth-wise direction D of the shade 102 and a different, second shade configuration along the remainder of the drop length 104 of the shade 102 (i.e., along a lower vertical portion 123 of the shade 102 across which at least a portion of the intermediate panel section 114C extends). For instance, FIG. 6 illustrates the shade 102 once the first panel section 114A has been completely unwound from the first roller 130 and approximately one-half of the second panel section 114B has been re-wound around the second roller 150 such that intermediate panel section 114C loops around the idling roller 195 with approximately one-half of such panel section 114C extending along the first side 110 of the shade 102 and the other half extending along the second side 112 of the shade 102. With such positioning of the various panel sections 114A, 114B, 114C, the upper vertical portion 121 may generally span the top-half of the drop length 104 of the shade 102, while the lower vertical portion 123 may generally span the bottom-half of the drop length 104 of the shade 102. Thus, in the illustrated example of FIG. 6, since the intermediate panel section 114C is formed from a light-filtering material or room darkening material, while the first and second panel sections 114A, 114B are formed from a transparent or sheer material, the covering 100 may have a transparent or sheer shade configuration along the upper vertical portion 121 (e.g., along the top-half of the drop length 104) and a light-filtering or room darkening shade configuration along the lower vertical portion 123 (e.g., along the bottom-half of the drop length 104). As a result, the covering 100 may, for example, allow for light transmission through a portion of the shade 102 (e.g., along the upper vertical portion 121), while still providing light-blocking or filtering functionality along the remainder of the shade 102.

It should be appreciated that, in several embodiments, the upper and lower vertical portions 121, 123 may collectively extend along the entirety of the drop length 104 of the shade 102 such that the summation of the vertical lengths or heights defined by the upper and lower vertical portions 121, 123 will generally be substantially equal to the drop length 104 of the shade 102. In such embodiments, the covering 100 may only provide the two shade configurations associated with the upper and lower vertical portions 121, 123 along the drop length 104 as opposed to, for example, the alternating or banded configuration of a zebra-type shade.

It should be appreciated that, with the shade 102 at the position shown in FIG. 6, the rotational direction 140 of the rollers 130, 150 may be reversed to move the shade 102 back to its retracted position, in which case the progression of shade movements described above with reference to FIGS. 4-6 will be reversed until the shade 102 reaches the position shown in FIG. 4. Alternatively, in the position shown in FIG. 6, further winding of the rollers 130, 150 in the rotational directions 140 will result in the shade 102 rising towards the retracted position as the first panel section 114A begins to re-wind around the first roller 130 while the intermediate panel section 114C begins to be wound around the second roller 150.

Figure 7:
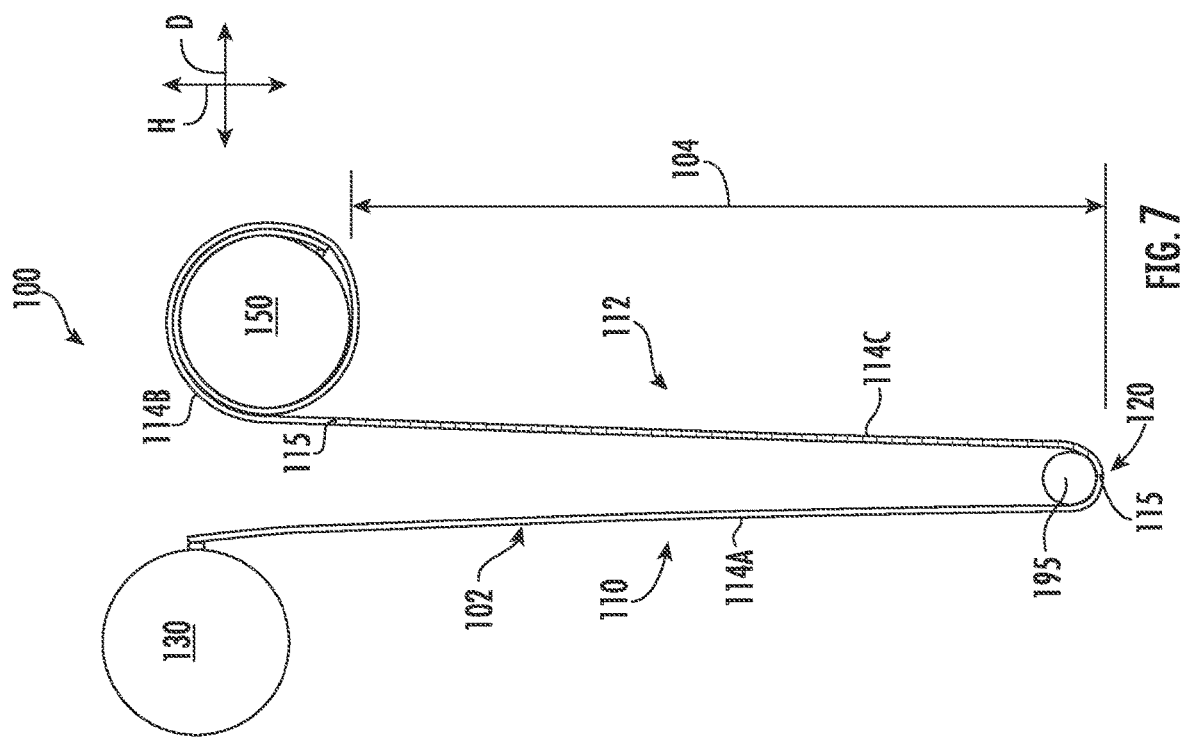
FIG. 7 illustrates a simplified, cross-sectional view of the disclosed covering having an embodiment of a multi-shade panel as in FIG. 3B coupled to the rollers in accordance with aspects of the present disclosure.

As indicated above, as an alternative to configuring the first panel section 114A to have a section length 125 (FIG. 3A) that is substantially equal to one-half or 50% of the drop length 104 of the shade 102 (e.g., as shown in the example embodiment of FIG. 3A), the first panel section 114A may, instead, have a section length 126 (FIG. 3B) that is substantially equal to the drop length 104 of the shade 102 (e.g., as shown in the example embodiment of FIG. 3B). With such an alternative configuration, the shade 102 will still undergo the same progression of shade movements as that described above with reference to FIGS. 4-6, except that only approximately one-half of the first panel section 114A will be unwound from the first roller 130 when the shade 102 initially reaches the position shown in FIG. 6 in which the covering 100 has a transparent or sheer shade configuration along the upper vertical portion 121 (e.g., along the top-half of the drop length 104) and a light-filtering or room darkening shade configuration along the lower vertical portion 123 (e.g., along the bottom-half of the drop length 104). At such a position, any further unwinding of the first panel section 114A and re-winding of the second panel section 114B with rotation of the rollers 130, 150 in the rotational direction 140 will generally result in the first panel section 114A extending further downwardly along the first side 110 of the shade 102 and the intermediate panel section 114C extending further upwardly along the second side 112 of the shade 102. As a result, the extent of the upper vertical portion 121 along which the transparent or sheer shade configuration is provided will generally decrease while the extent of the lower vertical portion 123 along which the light-filtering or room darkening shade configuration is provided will generally increase as the intermediate panel section 114C extends further upwardly along the second side 112 of the shade 102. For instance, FIG. 7 illustrates the shade panel arrangement of FIG. 3B after the first panel section 114A has been substantially or completely unwound from the first roller 130. As shown in FIG. 7, once the first panel section 114A is substantially or completely unwound from the first roller 130, first panel section 114A may generally extend along the first side 110 of the shade 102 fully between the looped end 120 of the shade 102 and the first roller 130, while the intermediate panel section 114C may generally extend along the second side 112 of the shade 102 fully between the looped end 120 of the shade 102 and the second roller 150, thereby providing the covering 100 with a full light-filtering or room darkening shade configuration as opposed to the hybrid shade configuration.

Referring now to FIG. 8, a schematic view of another embodiment of a panel arrangement for a multi-panel shade 102* is illustrated in accordance with aspects of the present disclosure, particularly illustrating the shade 102* completely unwound from associated rollers 130, 150 to show the respective lengths of the various panel sections 114* of the shade 102*. As shown in FIG. 8, the shade 102* has a three panel arrangement similar to the shade 102 described above with reference to FIG. 3B and includes a first panel section 114A*, a second panel section 114B*, and a third or intermediate panel section 114C* extending between the first and second panel sections 114A*, 114B* (e.g., between panel-to-panel interfaces 115*), with each panel section 114* defining a section length 126 that is substantially equal to the desired drop length 104 (FIG. 2) of the shade 102*. Additionally, as shown in FIG. 8, the shade 102* includes a first end 116* coupled to the first roller 130 and a second end 118* coupled to the second roller 150. However, the respective panel sections 114A*, 114B*, 114C* of the multi-panel shade 102* shown in FIG. 8 have different shade properties (e.g., light transmission characteristics) as compared to the panel sections 114A, 114B, 114C of the multi-panel shade 102 described above with reference to FIG. 3B, thereby allowing the associated covering to provide a different combination of shade configurations based on the relative positioning of the panel sections 114A*, 114B*, 114C* along the drop length 104 of the shade 102*. Specifically, in the illustrated example of FIG. 8, the first panel section 114A* is formed from a room darkening material (e.g., as indicated by the filled-in cross-section along such panel section 114A*), the intermediate panel section 114C* is formed from a light-filtering material (e.g., as indicated by the cross-hatching along such panel section 114C*), and the second panel section 114B* is formed from a transparent or a sheer material (e.g., as indicated by the lack of cross-hatching along such panel section 114B*). However, in an alternative embodiment, the second panel section 114B* may be formed from a light-filtering material, while still allowing the covering to achieve a similar combination of shade configurations.

Referring now to FIGS. 9-12, various cross-sectional, simplified views of one embodiment of a covering 100* are illustrated in accordance with aspects of the present disclosure, particularly illustrating the embodiment of the multi-panel shade 102* shown in FIG. 8 with the panel sections 114* in various wound/unwound states or positions relative to the first and second rollers 130, 150. Specifically, FIGS. 9-12 illustrate a time-ordered progression of the multi-panel shade 102* as the shade 102* is moved from the fully retracted position (FIG. 9) to an extended position (e.g., the fully extended position of FIG. 10) and as the shade 102* is subsequently moved between the rollers 130, 150 while in the extended position to adjust the shade configuration of the covering 100* (FIGS. 11 and 12).

Figure 10:
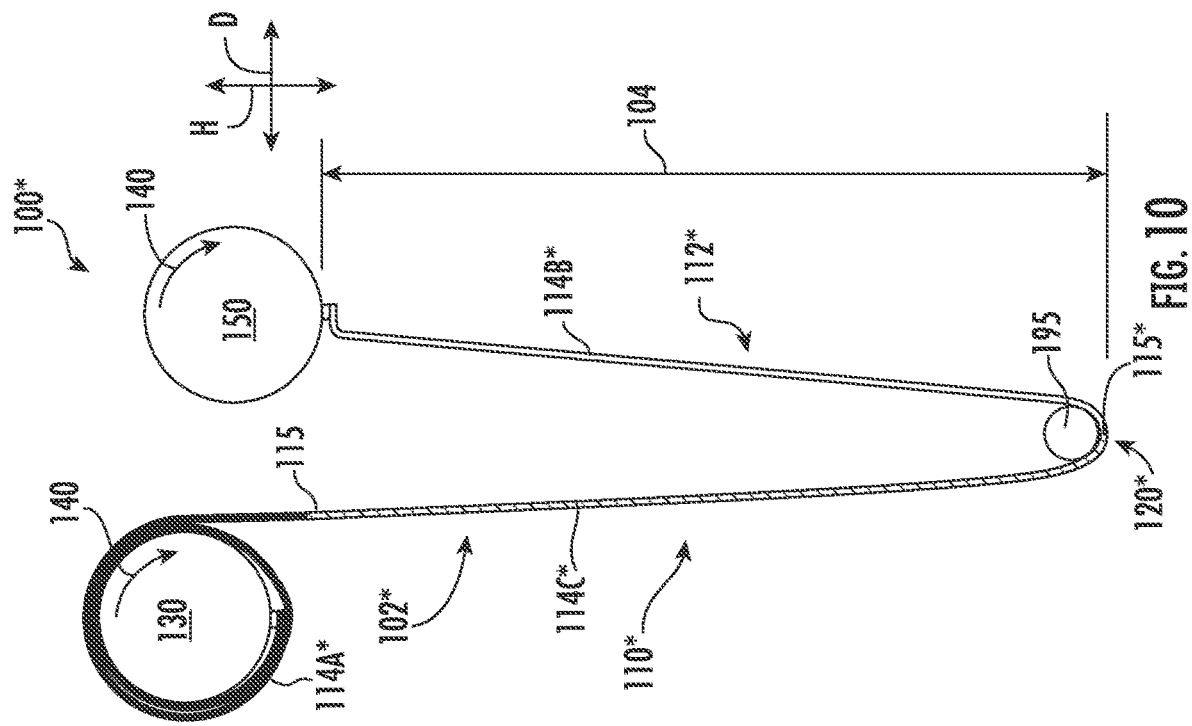
FIG. 10 illustrates another simplified, cross-sectional view of the covering shown in FIG. 9, particularly illustrating the covering after it has been initially moved to the extended position.
Figure 9:
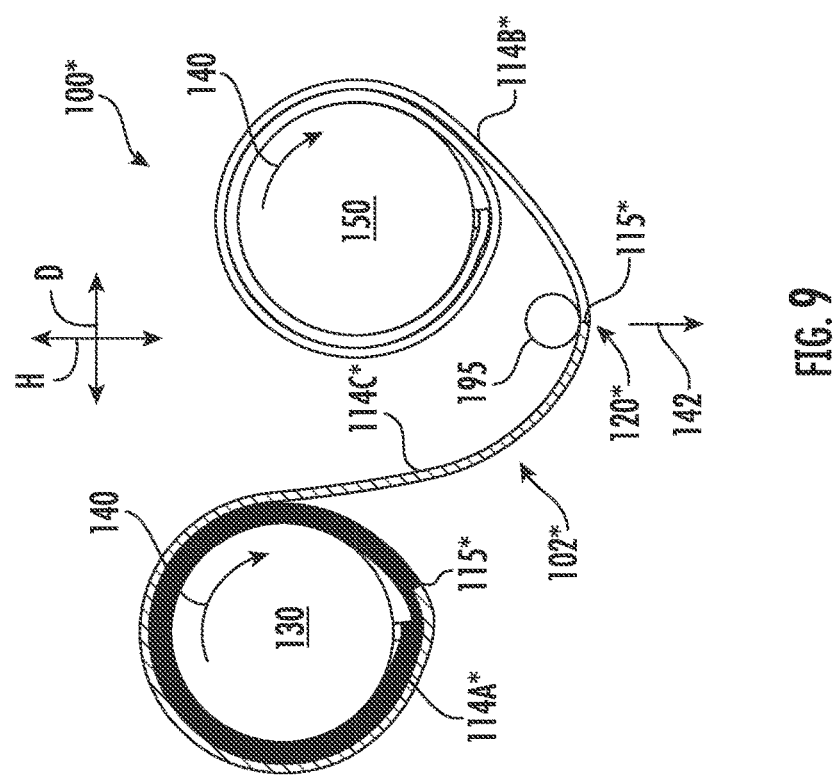
FIG. 9 illustrates a simplified, cross-sectional view of the disclosed covering having an embodiment of a multi-shade panel as in FIG. 8 coupled to the rollers in accordance with aspects of the present disclosure, particularly illustrating the covering in the retracted position.

As shown in FIG. 9, when in the retracted position, the shade 102* is configured to be primarily wound around the first and second rollers 130, 150. Specifically, in the illustrated example of FIG. 9, the first and intermediate panel sections 114A*, 114C* are substantially wound around the first roller 130, while the second panel section 114B* is substantially wound around the second roller 150, with a looped portion of the shade 102* being suspended from the rollers 130, 150 to so as to form a cradle or looped-end 120* that wraps around the idling roller 195 of the bottom rail assembly 190 (FIGS. 1 and 2). Additionally, as shown in FIGS. 9 and 10, to move the shade 102* from the retracted position to the extended position, the first and second rollers 130, 150 are rotated in a given direction (e.g., as indicated by arrow 140 shown in FIGS. 9 and 10) such that the shade 102* is simultaneously unwound from both rollers 130, 150. For purposes of discussion, the first and second rollers 130, 150 will be described as being rotated in the same direction (e.g., rotational direction 140 shown in FIGS. 9 and 10). However, in other embodiments, the first and second rollers 130, 150 may be counter-rotated (e.g., by being rotated in opposite directions).

As shown in FIG. 10, upon reaching the fully extended position, the intermediate panel section 114C* has been substantially or completely unwound from the first roller 130 such that the intermediate panel section 114C* generally spans the drop length 104 along the first side 110* of the shade 102*, while the second panel section 114B* has been substantially or completely unwound from the second roller 150 such that the second panel section 114B* generally spans the drop length 104 along the second side 112* of the shade 102*. With the intermediate and second panel sections 114C*, 114B* being exposed along the drop length 104 of the shade 102* in the manner shown in FIG. 10, the covering 100* may have a first shade configuration generally defined by the dominant light transmission characteristic between the exposed panel sections 114C*, 114B*. For instance, in the illustrated example of FIG. 10, since the intermediate panel section 114C* is formed from a light-filtering material and the second panel section 114B* is formed from a transparent or sheer material, the covering 100* will generally provide a light-filtering shade configuration along the entirety of the drop length 104 of the shade 102* when in the position shown in FIG. 10. It should be appreciated that, in the event that the second panel section 114B* is also formed from a light-filtering material, the covering 100* would generally provide the same light-filtering shade configuration along the entirety of the drop length 104 of the shade 102* when in the position shown in FIG. 10.

Additionally, as shown in FIG. 11, continued rotation of the rollers 130, 150 in the rotational direction 140 from the position shown in FIG. 10 results in the first panel section 114A* being unwound from the first roller 130 as the second panel section 114B* is being simultaneously re-wound around the second roller 150. As a result, the intermediate panel section 114C* begins to loop around the idling roller 195 such that portions of the intermediate panel section 114C* extend along both the first side 110* and the second side 112* of the shade 102*. The exposure of the first panel section 114A* along the first side 110* of the shade 102* while the intermediate panel section 114C* is looping around the idling roller 195 results in a hybrid shade configuration in which the covering 100 provides both a first shade configuration along an upper vertical portion 121* of the shade 102* across which the first panel section 114A* extends, and a different, second shade configuration along the remainder of the drop length 104 of the shade 102* (e.g., along a lower vertical portion 123* of the shade 102* across which the intermediate panel section 114C* extends). For instance, FIG. 11 illustrates the shade 102* once approximately one-half of the first panel section 114A* has been unwound from the first roller 130 and approximately one-half of the second panel section 114B* has been re-wound around the second roller 150 such that intermediate panel section 114C* loops around the idling roller 195 with approximately one-half of such panel section 114C* extending along the first side 110* of the shade 102* and other half extending along the second side 112* of the shade 102*. Since the intermediate panel section 114C* is formed from a light-filtering material and the first panel section 114A* is formed from a room darkening material, the covering 100* will have a room darkening configuration along the upper vertical portion 121* and a light-filtering shade configuration along the lower vertical portion 123*.

It should be appreciated that, any further unwinding of the first panel section 114A* and re-winding of the second panel section 114B* from the position shown in FIG. 11 will generally result in the first panel section 114A* extending further downwardly along the first side 110* of the shade 102* and the intermediate panel section 114C* extending further upwardly along the second side 112* of the shade 102*. As a result, the extent of the upper vertical portion 121* along which the room darkening shade configuration is provided will generally increase while the extent of the lower vertical portion 123* along which the light-filtering shade configuration is provided will generally decrease as the first panel section 114A* extends further downwardly along the first side 110* of the shade 102* (given the dominant light transmission characteristic of the first panel section 114A*). As shown in FIG. 12, once the first panel section 114A* is substantially or completely unwound from the first roller 130, the first panel section 114A* may generally extend along the first side 110* of the shade 102* fully between the looped end 120* of the shade 102* and the first roller 130, thereby providing the covering 100* with a full room darkening shade configuration as opposed to the hybrid shade configuration. At such point, to move the shade 102* back to its retracted position, the rotational direction 140 of the rollers 130, 150 may be reversed, in which case the progression of shade movements described above with reference to FIGS. 9-12 will be reversed until the shade 102* reaches the position shown in FIG. 9. Alternatively, in the position shown in FIG. 12, further winding of the rollers 130, 150 in the rotational direction 140 will result in the shade 102* rising towards the retracted position as the first panel section 114A* begins to re-wind around the first roller 130 while the intermediate panel section 114C* begins to be wound around the second roller 150.

Referring now to FIG. 13, a schematic view of a further embodiment of a panel arrangement for a multi-panel shade 102' is illustrated in accordance with aspects of the present disclosure, particularly illustrating the shade 102' completely unwound from associated rollers 130, 150 to show the respective lengths of the various panel sections 114' of the shade 102'. As shown in FIG. 13, the shade 102' has a three panel arrangement similar to the shades 102, 102* described above with reference to FIGS. 3B and 8, and includes a first panel section 114A', a second panel section 114B', and a third or intermediate panel section 114C' extending between the first and second panel sections 114A', 114B' (e.g., between panel-to-panel interfaces 115'), with each panel section 114' defining a section length 126 that is substantially equal to the desired drop length 104 (FIG. 2) of the shade 102'. Additionally, as shown in FIG. 13, the shade 102' includes a first end 116' coupled to the first roller 130 and a second end 118' coupled to the second roller 150. However, the respective panel sections 114A', 114B', 114C' of the multi-panel shade 102' shown in FIG. 13 have different shade properties (e.g., light transmission characteristics) as compared to the panel sections 114, 114* of the multi-panel shades 102, 102* described above with reference to FIGS. 3B and 8, thereby allowing the associated covering to provide a different combination of shade configurations based on the relative positioning of the panel sections 114A', 114B', 114C' along the drop length 104 of the shade 102'. Specifically, in the illustrated example of FIG. 13, the first panel section 114A' is formed from a light-filtering material or a room darkening material (e.g., as indicated by the cross-hatching along such panel section), while the intermediate panel section 114C' and the second panel section 114B' are both formed from a transparent or a sheer material (e.g., as indicated by the lack of cross-hatching along such panel sections). In one embodiment, both the intermediate and second panel sections 114C', 114B' may be made from the same type of material (e.g., transparent, sheer, etc.), such as by forming both panel sections 114C', 114B' from a transparent material (e.g., a transparent film) or by forming both panel sections 114C', 114B' from a sheer material. When forming both panel sections 114C', 114B' from the same type of material, the panel sections 114C', 114B' may, in one embodiment, be simply formed as one continuous panel section. Alternatively, the intermediate and second panel sections 114C', 114B' may be made from different types of material (e.g., transparent, sheer, etc.), such as by forming one of the panel sections from a transparent material (e.g., a transparent film) and the other panel section from a sheer material. It should be appreciated that, when forming both the first and second panel sections 114C', 114B' from a sheer material (or a transparent material), different sheer materials (or different transparent materials) may be used to form the first and second panel sections 114C', 114B'. For instance, when forming both the first and second panel sections 114C', 114B' from a sheer material, it may be desirable to utilize different sheer materials for the first and second panel sections 114C', 114B' prevent the occurrence of any moire effects.

Figure 17:
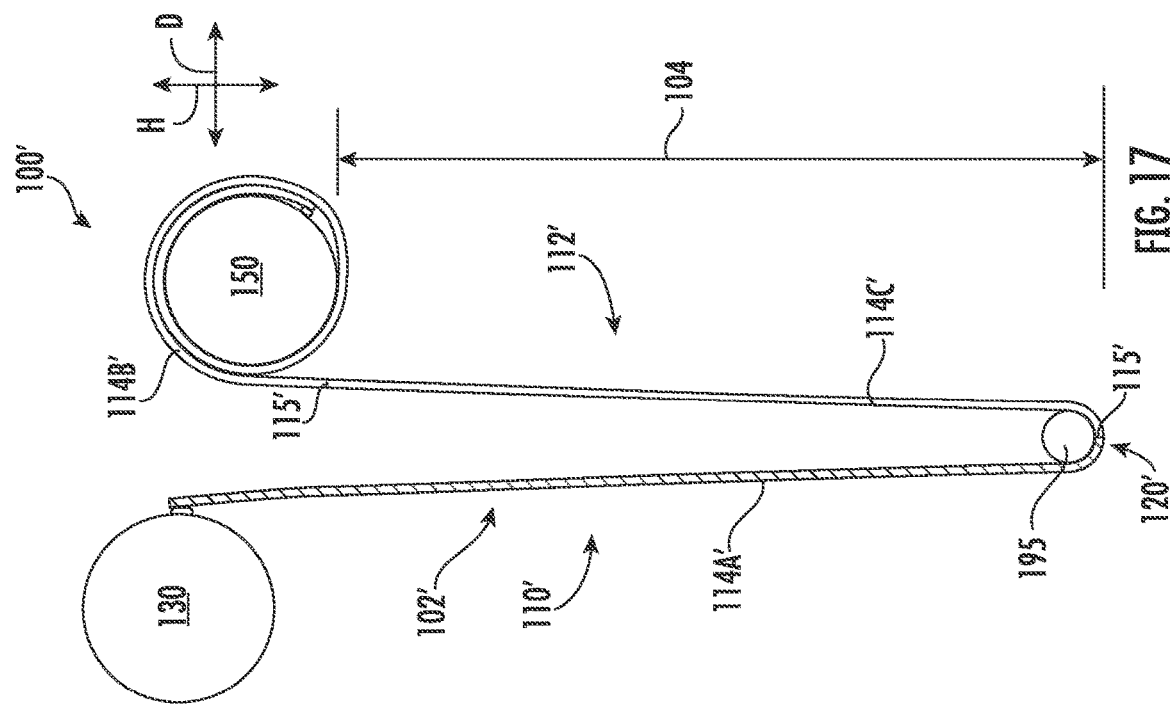
FIG. 17 illustrates a further simplified, cross-sectional view of the covering shown in FIG. 14, particularly illustrating the covering after the multi-panel shade has been further unwound from and/or wound around the rollers from the position shown in FIG. 16 to adjust the shade configuration of the covering.
Figure 16:
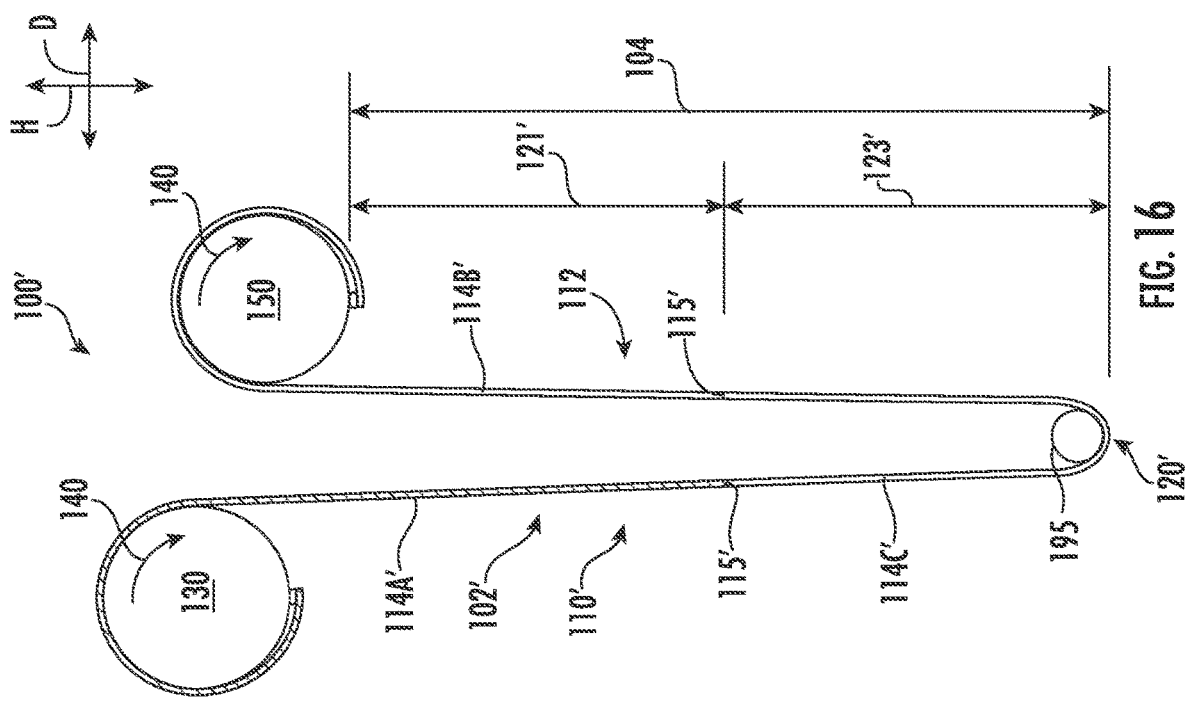
FIG. 16 illustrates yet another simplified, cross-sectional view of the covering shown in FIG. 14, particularly illustrating the covering after the multi-panel shade has been further unwound from and/or wound around the rollers from the position shown in FIG. 15 to adjust the shade configuration of the covering.

Referring now to FIGS. 14-17, various cross-sectional, simplified views of a further embodiment of a covering 100' are illustrated in accordance with aspects of the present disclosure, particularly illustrating the embodiment of the multi-panel shade 102' shown in FIG. 13 with the panel sections 114' in various wound/unwound states or positions relative to the first and second rollers 130, 150. Specifically, FIGS. 14-17 illustrate a time-ordered progression of the multi-panel shade 102' as the shade 102' is moved from the fully retracted position (FIG. 14) to an extended position (e.g., the fully extended position of FIG. 15) and as the shade 102' is subsequently moved between the rollers 130, 150 while in the extended position to adjust the shade configuration of the covering 100' (FIGS. 16 and 17).

As shown in FIG. 14, when in the retracted position, the shade 102' is configured to be primarily wound around the first and second rollers 130, 150. Specifically, in the illustrated example of FIG. 14, the first and intermediate panel sections 114A', 114C' are substantially wound around the first roller 130, while the second panel section 114B' is substantially wound around the second roller 150, with a looped portion of the shade 102' being suspended from the rollers 130, 150 to so as to form a cradle or looped-end 120' that wraps around the idling roller 195 of the bottom rail assembly 190 (FIGS. 1 and 2). Additionally, as shown in FIGS. 14 and 15, to move the shade 102' from the retracted position to the extended position, the first and second rollers 130, 150 are rotated in a given direction (e.g., as indicated by arrow 140 shown in FIGS. 14 and 15) such that the shade 102' is simultaneously unwound from both rollers 130, 150. For purposes of discussion, the first and second rollers 130, 150 will be described as being rotated in the same direction (e.g., rotational direction 140 shown in FIGS. 14 and 15). However, in other embodiments, the first and second rollers 130, 150 may be counter-rotated (e.g., by being rotated in opposite directions).

As shown in FIG. 15, upon reaching the fully extended position, the intermediate panel section 114C' has been substantially or completely unwound from the first roller 130 such that the intermediate panel section 114C' generally spans the drop length 104 along the first side 110' of the shade 102', while the second panel section 114B' has been substantially or completely unwound from the second roller 150 such that the second panel section 114B' generally spans the drop length 104 along the second side 112' of the shade 102'. With the intermediate and second panel sections 114C', 114B' being exposed along the drop length 104 of the shade 102' in the manner shown in FIG. 15, the covering 100' may have a first shade configuration generally defined by the dominant light transmission characteristic between the exposed panel sections 114C', 114B'. For instance, in the illustrated example of FIG. 15, since the intermediate and second panel sections 114C', 114B' are either formed from a transparent material or a sheer material, the covering 100' will generally provide a sheer shade configuration along the entirety of the drop length 104 of the shade 102' (e.g., when at least one of the panel sections is formed from a sheer material), or a transparent shade configuration along the entirety of the drop length 104 of the shade 102' (e.g., when both panel sections are formed from a transparent material) while in the position shown in FIG. 15.

Additionally, as shown in FIG. 16, continued rotation of the rollers 130, 150 in the rotational direction 140 from the position shown in FIG. 15 results in the first panel section 114A' being unwound from the first roller 130 as the second panel section 114B' is being simultaneously re-wound around the second roller 150. As a result, the intermediate panel section 114C' begins to loop around the idling roller 195 so that portions of the intermediate panel section 114C' extend along both the first side 110' and the second side 112' of the shade 102'. The exposure of the first panel section 114A' along the first side 110' of the shade 102' while the intermediate panel section 114C' is looping around the idling roller 195 results in a hybrid shade configuration in which the covering 100' provides both a first shade configuration along an upper vertical portion 121' of the shade 102' across which the first panel section 112A' extends, and a different, second shade configuration along the remainder of the drop length 104 of the shade 102' (e.g., along a lower vertical portion 123' of the shade 102' across which the intermediate and second panel sections 114C', 114B' are aligned in the depthwise direction D of the shade 102'). For instance, FIG. 16 illustrates the shade 102' once approximately one-half of the first panel section 114A' has been unwound from the first roller 130 and approximately one-half of the second panel section 114B' has been re-wound around the second roller 150 such that intermediate panel section 114C' loops around the idling roller 195 with approximately one-half of such panel section 114C' extending along the first side 110' of the shade 102' and the other half extending along the second side 112' of the shade 102'. Since the intermediate panel section 114C' is formed from a transparent or sheer material and the first panel section 114A' is formed from a light-filtering or room darkening material, the covering 100' will have a light-filtering or room darkening shade configuration along the upper vertical portion 121' and a transparent or sheer shade configuration along the lower vertical portion 123'.

It should be appreciated that any further unwinding of the first panel section 114A' and re-winding of the second panel section 114B' from the position shown in FIG. 16 with rotation of the rollers 130, 150 in the rotational direction 140 will generally result in the first panel section 114A' extending further downwardly along the first side 110' of the shade 102' and the intermediate panel section 114C' extending further upwardly along the second side 112' of the shade 102'. As a result, the extent of the upper vertical portion 121' along which the light-filtering or room darkening shade configuration is provided will generally increase, while the extent of the lower vertical portion 123' along which the transparent or sheer shade configuration is provided will generally decrease as the first panel section 114A' extends further downwardly along the first side 110' of the shade 102'. As shown in FIG. 17, once the first panel section 114A' is completely unwound from the first roller 130, the first panel section 114A' may generally extend along the first side 110' of the shade 102' fully between the looped end 120' of the shade 102' and the first roller 130, thereby providing the covering 100' with a full light-filtering or room darkening shade configuration as opposed to the hybrid shade configuration. At such point, to move the shade 102' back to the retracted position, the rotational direction 140 of the rollers 130, 150 may be reversed, in which case the progression of shade movements described above with reference to FIGS. 14-17 will be reversed until the shade 102' reaches the position shown in FIG. 14. Alternatively, in the position shown in FIG. 17, further winding of the rollers 130, 150 in the rotational direction 140 will result in the shade 102' rising towards the retracted position as the first panel section 114A' begins to re-wind around the first roller 130, while the intermediate panel section 114C' continues to be wound around the second roller 150.

Referring back to FIGS. 1 and 2, as indicated above, the disclosed covering 100 may also include a headrail assembly 170, with the disclosed multi-panel shade being configured to extend downwardly from the headrail assembly 170 when in the extended position. As particularly shown in FIG. 1, the headrail assembly 170 includes an upper rail housing 172 configured to house the first and second rollers 130, 150. For instance, in the illustrated example of FIGS. 1 and 2, the upper rail housing 172 is configured to extend in the lateral direction L between a first rail end 174 and a second rail end 176, with a sufficient length being defined between the opposed ends 174, 176 such that the rollers 130, 150 can extend axially within the rail housing 172 along the lateral direction L. Additionally, as shown in FIG. 1, the head rail assembly 170 includes first and second endcaps 184, 186 configured to be coupled to the opposed first and second ends 174, 176, respectively, of the upper rail housing 172. In one embodiment, the endcaps 184, 186 may be configured to rotatably support the rollers 130, 150 relative to the upper rail housing 172. For instance, the ends of the rollers 130, 150 may be coupled to the endcaps 184, 186 in a manner that allows the rollers 130, 150 to rotate relative to both the endcaps 184, 186 and the upper rail housing 172 as the shade 102 is being wound around and/or unwound from the rollers 130, 150.

Additionally, as indicated above, the covering 100 also includes a bottom rail assembly 190. In embodiments in which the covering 100 includes both the headrail assembly 170 and the bottom rail assembly 190, the shade 102 may be configured to extend vertically between such assemblies 170, 190. As shown in FIGS. 1 and 2, the bottom rail assembly 190 includes a lower rail housing 192, with the idling roller 195 of the bottom rail assembly 190 being configured to extend lengthwise within the lower rail housing 192 along the lateral direction L (FIG. 1) of the covering 100. The idling roller 195 may generally be rotationally supported within the lower rail housing 192 for rotation relative to the rail housing 192 about an idling axis of rotation 196 (FIG. 2). For instance, in one embodiment, the idling roller 195 may be rotationally supported within the lower rail housing 192 via lower rail endcaps 193, 194 coupled to the opposed lateral ends of the lower rail housing 192. It should be appreciated that the lower rail housing 192 may be in the form of a bottom rail for aesthetic purposes.

As shown in FIG. 2, the shade 102 is looped around the idling roller 195 of the bottom rail assembly 190. For instance, as shown in FIG. 2 and as described above, the shade 102 includes a looped bottom end 120 that is looped around a bottom half of the idling roller 195. In this regard, as the shade 102 is being unwound from one of the rollers 130, 150 and wound around the other roller 130, 150 to adjust the shade configuration of the covering 100 when in the extended position, the idling roller 195 may rotate about its axis of rotation 196 as the shade 102 loops around the roller 195 along the looped bottom end 120. Additionally, as shown in FIG. 2, given its looped configuration, the shade 102 includes both a first shade segment 122 and a second shade segment 124 extending vertically between the headrail assembly 170 and the bottom rail assembly 190 along the drop length 104, with the first shade segment 122 forming the first side 110 of the shade 102 (e.g., the portion of the shade extending between the looped bottom end 120 of the shade 102 and the first roller 130) and the second shade segment 124 forming the second side 112 of the shade 102 (e.g., the portion of the shade 102 extending between the looped bottom end 120 of the shade 102 and the second roller 150.

It should be appreciated that, in several embodiments, one or both of the rollers 130, 150 of the covering 100 may be associated with a suitable drive system configured to rotationally drive the roller(s) 130, 150, thereby allowing the shade to be unwound from and wound around the roller(s) 130, 150, as desired. For instance, as shown in FIG. 2, a control cord 180 is operatively coupled to one of the rollers (e.g., the second roller 150) for rotationally driving such roller via an associated drive mechanism 182 (e.g., a sprocket drive gear and associated gear housing). In such an embodiment, as will be described below, the rollers 130, 150 may, for example, be coupled to each other such that both rollers 130, 150 rotate simultaneously with manipulation of the control cord 180 by a user. Alternatively, any other suitable drive mechanism or drive source may be used to rotationally drive one or both of the rollers 130, 150, such as an electric motor, a spring motor, and/or the like.

Figure 18:
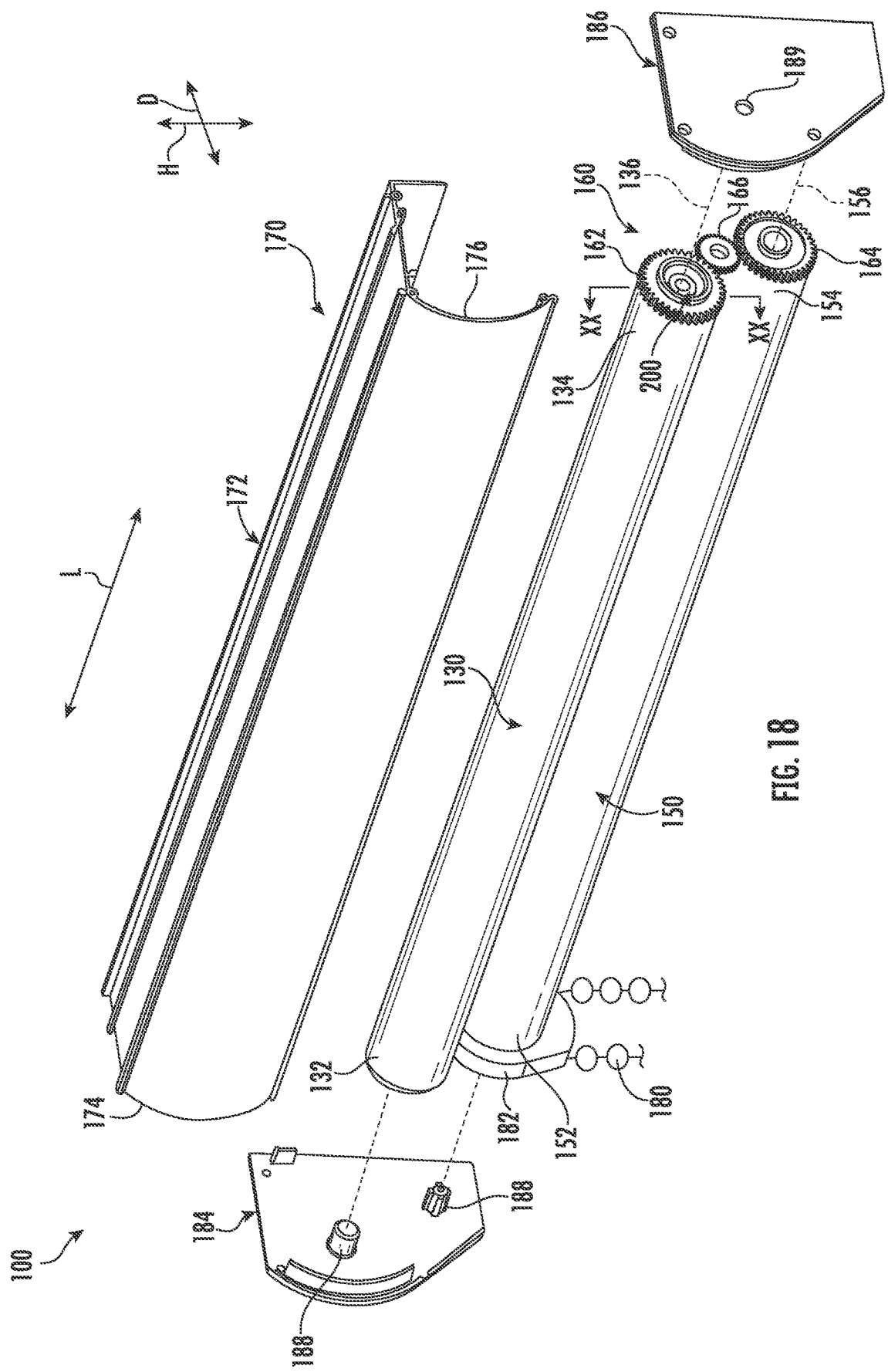
FIG. 18 illustrates an exploded, perspective view of a portion of the covering shown in FIG. 1, particularly illustrating components of a headrail assembly of the covering exploded away from rollers and an associated drive arrangement of the covering in accordance with aspects of the present disclosure.

Referring now to FIG. 18, a perspective view of the rollers 130, 150 of the covering 100 shown in FIGS. 1 and 2 is illustrated in accordance with aspects of the present disclosure, with various components of the headrail assembly 170 (e.g., the upper rail housing 172 and the endcaps 184, 186) being exploded away from the rollers 130, 150 for purposes of illustration to show the relative positioning of the rollers 130, 150 when installed within the headrail assembly 170. In general, the rollers 130, 150 are configured to extend lengthwise within the upper rail housing 172 along the lateral direction L between the opposed endcaps 184, 186 of the headrail assembly 170. As shown in FIG. 18, the first roller 130 extends lengthwise between a first end 132 of the roller 130 and an opposed second end 134 of the roller 130. Similarly, the second roller 150 extends lengthwise between a first end 152 of the roller 150 and an opposed second end 154 of the roller 150. As indicated above, the ends of the rollers 130, 150 may be coupled to the endcaps 184, 186 to allow the rollers 130, 150 to be rotationally supported within the upper rail housing 172. For instance, the first ends 132, 152 of the rollers 130, 150 may be coupled to the first endcap 184, while the second ends 134, 154 of the rollers 130, 150 may be coupled to the second endcap 186 in a manner that allows the first and second rollers 130, 150 to rotate relative to the endcaps 184, 186 and the upper rail housing 172 about separate first and second axes of rotation 136, 156, respectively. As shown in FIG. 18, the end caps 184, 186 may include posts 188 or similar features to facilitate rotationally coupling the adjacent ends of each roller 130, 150 to each respective endcap 184, 186.

In several embodiments, the rollers 130, 150 may be rotationally coupled to each other such that the rollers 130, 150 are configured to rotate simultaneously when one of the rollers 130, 150 is being rotationally driven. For instance, in the illustrated example of FIG. 18, the rollers 130, 150 are rotationally coupled via a drive arrangement 160, such as a gear drive arrangement or any other suitable drive arrangement. As shown in FIG. 18, the drive arrangement 160 includes first and second roller gears 162, 164 coupled to ends of the rollers 130, 150 (e.g., the second ends 134, 154 of the rollers 130, 150) and an idler gear 166 coupled between the roller gears 162, 164. In such an embodiment, the gears 162, 164, 166 may be configured to rotationally engage one another such that, when one of the rollers 130, 150 is rotationally driven, rotation of such roller is transmitted to the other roller to facilitate simultaneous rotation of the rollers 130, 150 (e.g., in the same rotational direction).

It should be appreciated that, in other embodiments, any other suitable coupling or drive arrangement may be utilized to allow for simultaneous rotation of the rollers 130, 150. For instance, in one alternative embodiment, the first and second roller gears 162, 164 may be configured to mesh directly with each other (as opposed to with the idler gear 166). In such an embodiment, the rollers 130, 150 may be configured to rotate simultaneously, but in opposite rotational directions. An exemplary direct drive arrangement will be described below with reference to FIG. 23. In another embodiment, the rollers 130, 150 may include pulleys or sprocket gears coupled to their adjacent ends 134, 154 (e.g., as opposed to the roller gears 162, 164). In such an embodiment, a belt or chain may be wrapped around the pulleys/sprockets to facilitate simultaneous rotation of the rollers 130, 150.

It should be appreciated that, when the first and second rollers 130, 150 are rotationally coupled to each other, a single drive mechanism may be used to rotationally drive both rollers 130, 150. For instance, in the illustrated example of FIG. 18, a drive mechanism 182 (e.g., a drive sprocket assembly) is provided at the first end 152 of the second roller 150 for providing a rotational input for driving the roller 150. In such an embodiment, the above-described control cord 180 may, for example, be operatively coupled to the drive mechanism 182 such that, as the control cord 180 is pulled, the second roller 150 is rotationally driven by the drive mechanism 182, which, in turn, results in simultaneous rotation of the first roller 130 via the drive arrangement 160. Alternatively, the drive mechanism 182 may be coupled to the first end 132 of the first roller 130 to allow the control cord 180 to be used to rotationally drive the first roller 130, in which case the second roller 150 may be configured to be driven by the first roller 130 via the drive arrangement 160. In other embodiments, any other suitable drive mechanism may be used to rotationally drive the rollers 130, 150, such as a drive mechanism that does not require a control cord (e.g., an electric motor or a spring motor).

It should also be appreciated that, when the first and second rollers 130, 150 are rotationally coupled to each other, it may be desirable for the disclosed covering 100 to include a clutch-type mechanism or any other suitable means for rotationally disengaging the rollers 130, 150, thereby allowing for rotation of one of the rollers 130, 150 relative to the other (e.g., to facilitate drop length adjustments for the shade 102). For instance, in the illustrated example of FIG. 18, a clutch assembly 200 is provided in operative association with the first roller 130 and the first roller gear 162 to allow the first roller 130 to be disengaged from the drive arrangement 160, thereby permitting relative rotation between the rollers 130, 150. Alternatively, the clutch assembly 200 may be provided in operative association with the second roller 150 to allow the second roller 150 to be disengaged from the drive arrangement 160.

As an alternative to rotationally coupling the rollers 130, 150 together for simultaneous rotation, each roller 130, 150 may be configured to be independently driven via a separate drive mechanism. For instance, in one embodiment, a separate drive motor may be coupled to each roller 130, 150, such as by coupling a first electric motor to the first roller 130 and a second electric motor to the second roller 150. In such an embodiment, the rollers 130, 150 may be simultaneously rotated (e.g., in the same direction or in opposite directions) without requiring a drive arrangement or any other suitable coupling arrangement between the rollers 130, 150. Rather, the operation of the motors may be separately controlled to facilitate simultaneous rotation of both rollers 130, 150, such as by activating both motors at the same time to allow both rollers 130, 150 to be simultaneously driven. An exemplary motor-based drive arrangement will be described below with reference to FIG. 25.

It should be appreciated by those of ordinary skill in the art that the rate at which the shade 102 pays off or winds around a given roller 130, 150 with rotation of the roller 130, 150 will generally vary based on the effective diameter of the roller 130, 150 (i.e., the outer diameter of the roller plus the thickness of the shade material wrapped around the roller). Thus, in instances in which the amount of shade material wrapped around the first and second rollers 130, 150 will differ significantly, it may be desirable to provide a slight differential in the rotational speeds between the two rollers 130, 150 to account for any variations in the effective diameters between the rollers 130, 150 and, thus, any variations in the rates at which the shade 102 pays off or winds around each respective roller 130, 150. For instance, if the covering is configured such that more shade material will typically be wrapped around the first roller 130 than the second roller 150 (and thus, the first roller 130 will typically have a larger effective diameter than the second roller 150), the second roller 150 may be configured to rotate slightly slower than the first roller 130 to ensure that the rate at which the shade 102 pays off or winds around each roller 130, 150 is substantially the same. In such instance, the speed differential between the rollers 130, 150 may be achieved in a variety of different ways. For example, in the illustrated example of FIG. 18, a gear ratio may be provided between the first and second roller gears 162, 164 to achieve the desired speed differential, such as by configuring the second roller gear 164 to have a different diameter (or number of gear teeth) than the diameter (or number of gear teeth) of the first roller gear 162 (e.g., a slightly larger diameter than the diameter of the first roller gear 162). In another embodiment, the outer diameters of the rollers 130, 150 may be varied to account for different amounts of shade material being wrapped therearound. Alternatively, in an embodiment in which the rollers 130, 150 are configured to be independently driven via separate electric motors (e.g., as will be described below with reference to FIG. 25), the output speeds of the motors may be varied slightly to provide the desired speed ratio between the rollers 130, 150. For example, the speed differential between the motors can be programmed into the motor control logic to account for any variations in the effective diameters between the rollers 130, 150 as the shade 102 is paid off or wound around each respective roller 130, 150.

Figure 19:
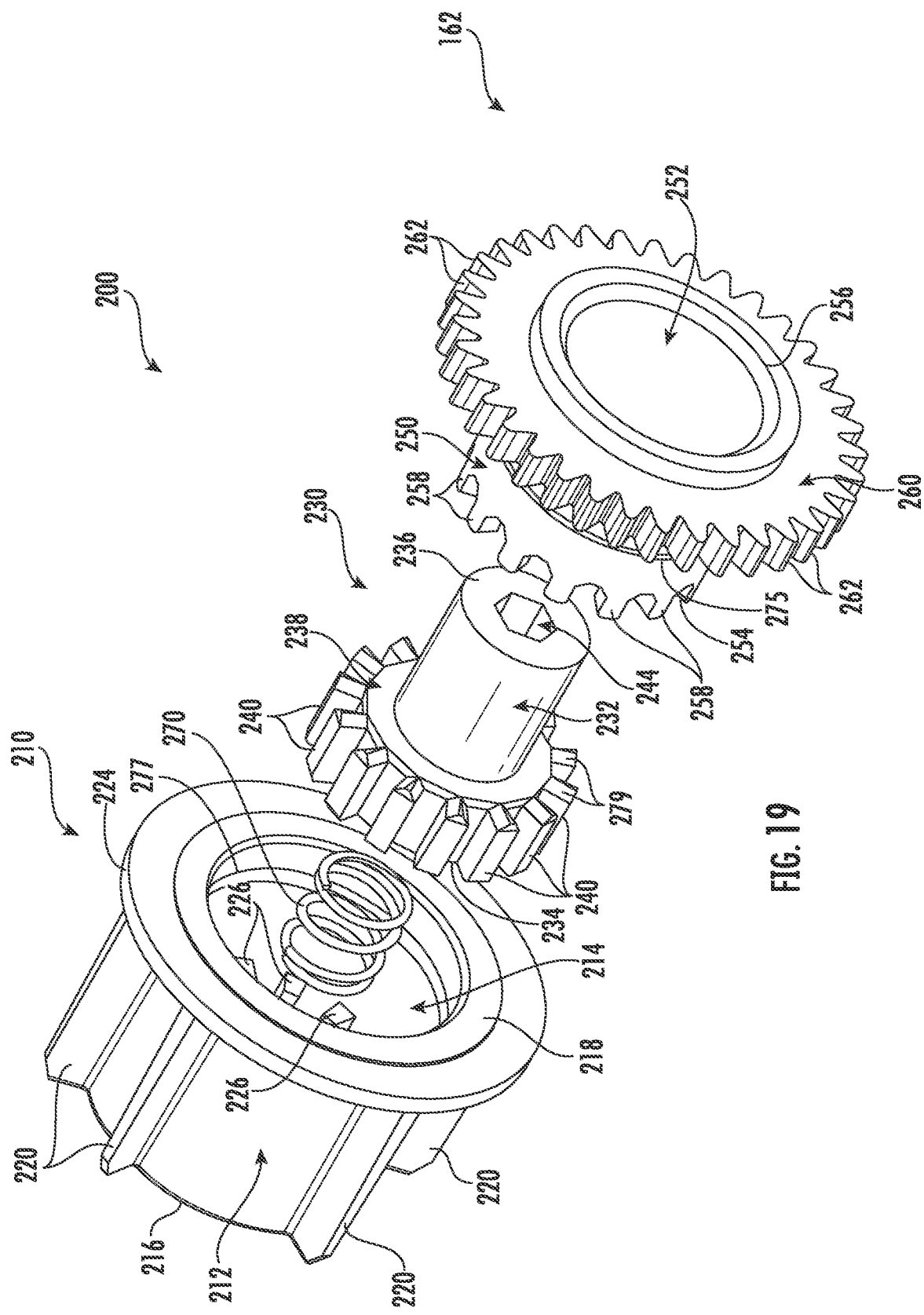
FIG. 19 illustrates an exploded view of one embodiment of a clutch assembly suitable for use with the disclosed covering in accordance with aspects of the present disclosure.
Figure 20:
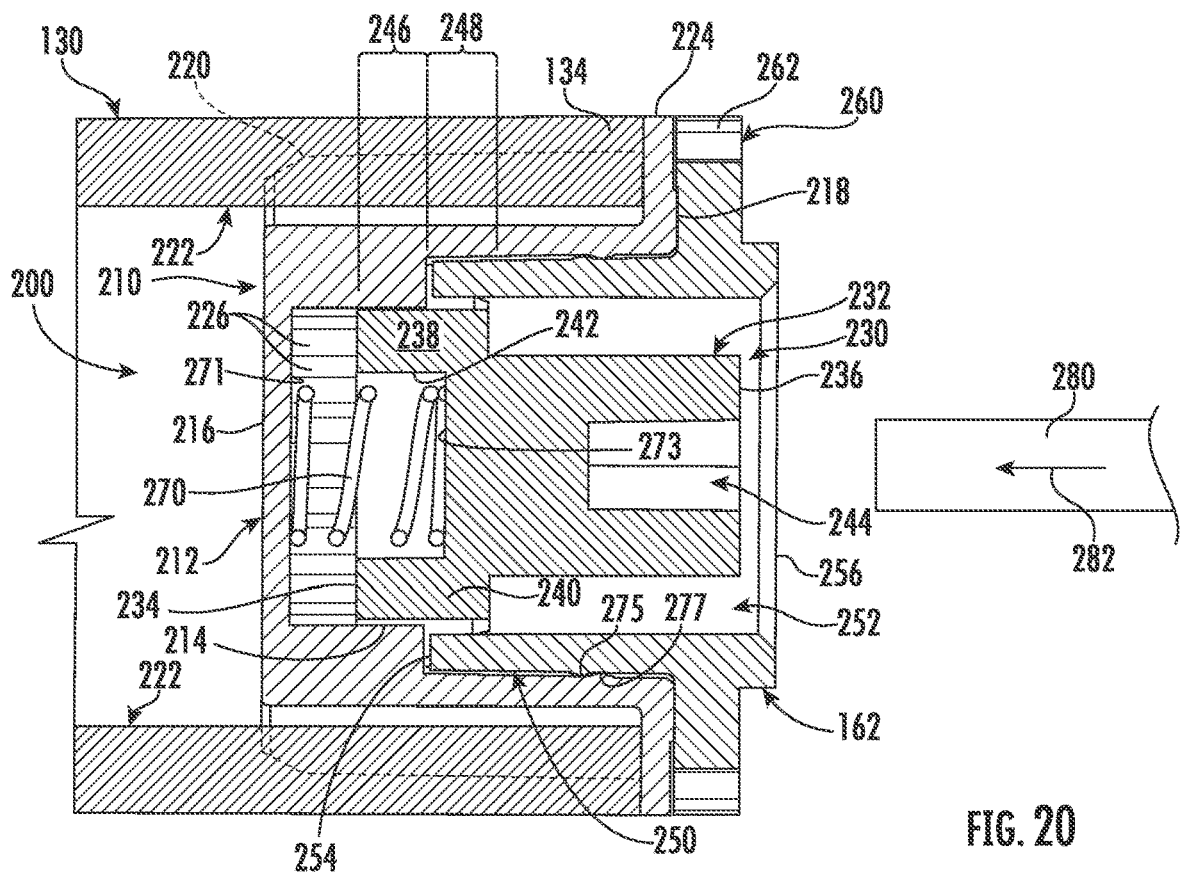
FIG. 20 illustrates a cross-sectional view of the clutch assembly shown in FIG. 19 as taken about line XX-XX in FIG. 18 in accordance with aspects of the present disclosure, particularly illustrating a clutch member of the clutch assembly at an engaged or first position.
Figure 21:
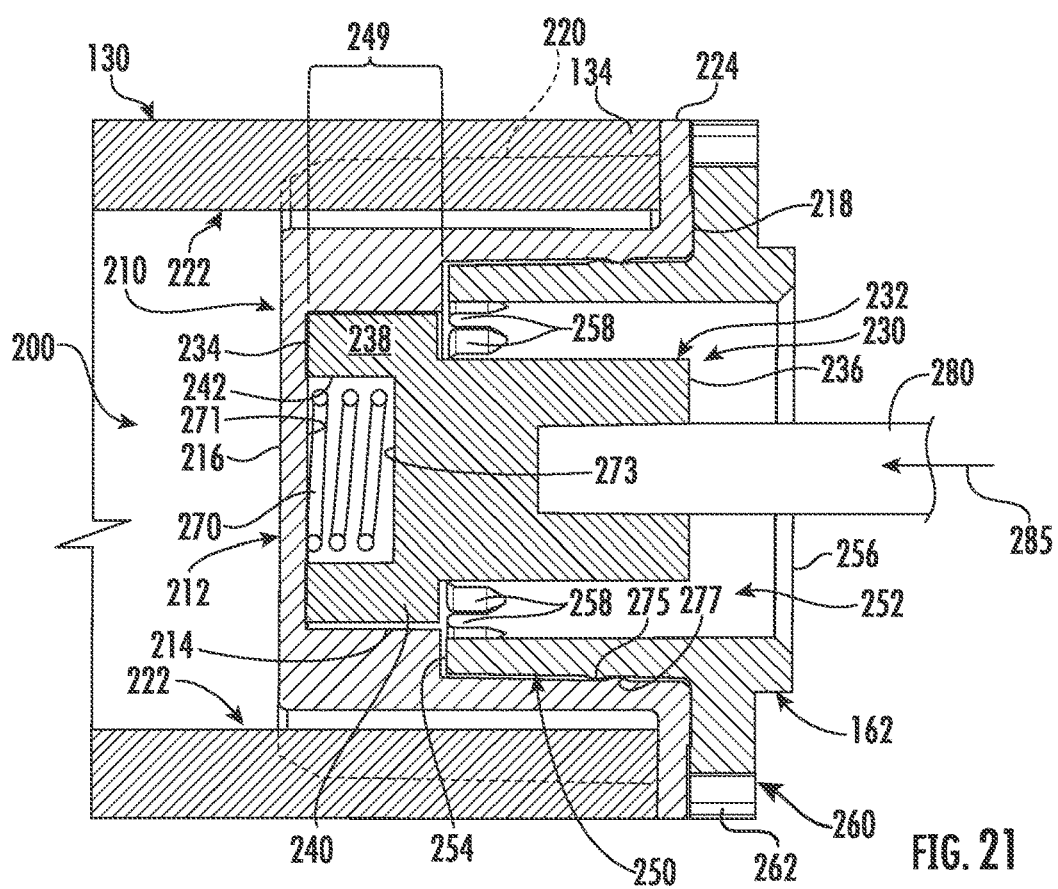
FIG. 21 illustrates another cross-sectional view of the clutch assembly shown in FIG. 19, particularly illustrating the clutch member of the clutch assembly moved from the engaged or first position to a disengaged or second position.

Referring now to FIGS. 19-21, one embodiment of a clutch assembly 200 suitable for use with an operating mechanism of the disclosed covering is illustrated in accordance with aspects of the present disclosure. For purposes of discussion, the clutch assembly 200 will be described herein as being provided in operative association with the first roller 130 and the first roller gear 162 of the drive arrangement 160 in the manner generally described above with reference to the embodiment of the covering 100 shown in FIG. 18, thereby allowing the first roller 130 to be de-coupled or disengaged from the drive arrangement 160. In this regard, FIGS. 20 and 21 illustrate different cross-sectional views of a portion of the roller/clutch/drive arrangement shown in FIG. 18 taken about line XX-XX. However, it should be appreciated that, in alternative embodiments, the clutch assembly 200 may, instead, be provided in operative association with the second roller 150 and the second roller gear 164 of the drive arrangement 160 to allow the second roller 150 to be de-coupled or disengaged from the drive arrangement 160. In even further embodiments, separate clutch assemblies 200 may be provided between each roller 130, 150 and the drive arrangement 160, thereby allowing each roller 130, 150 to be independently de-coupled from the drive arrangement 160.

In general, the clutch assembly 200 may be configured to allow the associated roller (e.g., the first roller 130 in the embodiment shown in FIGS. 19-21) to be selectively disengaged from the drive arrangement 160, thereby allowing each roller to be rotated independent of the other. Specifically, in several embodiments, the clutch assembly 200 is normally configured to be in an engaged state in which the clutch assembly 200 functions to provide a rotational coupling between the associated roller and the drive arrangement, thereby allowing rotational motion of the associated roller to be transferred to the other roller via drive arrangement 160 and vice versa. However, when the clutch assembly 200 is transitioned to a disengaged state, the clutch assembly 200 is rotationally disengaged from the drive arrangement 160 to allow for independent rotation of the rollers.

As particularly shown in FIG. 19, in several embodiments, the clutch assembly 200 includes a first clutch member 210, and a second clutch member 230 configured to be rotationally engaged with the first clutch member 210. In general, the first clutch member 210 may be configured to be rotationally fixed or coupled to the first roller 130, thereby allowing the first clutch member 210 to rotate with corresponding rotation of the first roller 130. Additionally, the second clutch member 230 is configured to be positioned between the first clutch member 210 and the adjacent first roller gear 162, and is movable relative to such components between an engaged or first position (e.g., as shown in FIG. 20), in which the second clutch member 230 engages both the first clutch member 210 and the first roller gear 162, and a disengaged or second position (e.g., as shown in FIG. 21), in which the second clutch member 230 is rotationally disengaged from the first roller gear 162. As such, with the second clutch member 230 in the engaged/first position (e.g., as shown in FIG. 20), the clutch assembly 200 may function to provide a rotational coupling between the first roller 130 and the first roller gear 162, thereby allowing rotational motion of the first roller 130 to be transferred through the clutch assembly 200 to the drive arrangement 160 (FIG. 3) such that the first and second rollers 130, 150 rotate simultaneously via the connection provided by the drive arrangement 160. However, when the second clutch member 230 is moved to the disengaged/second position (e.g., as shown in FIG. 21), the clutch assembly 200 is configured to be rotationally disengaged from the first roller gear 162 (and, thus, effectively disengaged from the gear drive engagement 160), thereby allowing the first roller 130 and the second roller 150 to be rotated independently of each other.

As shown in FIGS. 19-21, the first clutch member 210 includes a generally cylindrical, hollow body 212 defining an interior cavity 214 extending axially between a closed end 216 of the first clutch member 210 and an open end 218 of the first clutch member 210. As will be described below, the interior cavity 214 may be configured to receive portions of both the second clutch member 230 and the first roller gear 162. Additionally, as indicated above, the first clutch member 210 may generally be configured to be rotationally fixed or coupled to the first roller 130. As particularly shown in FIG. 19, in one embodiment, the first clutch member 210 includes a plurality of ribs 220 projecting radially outwardly therefrom, with the ribs 220 being spaced apart circumferentially around the outer perimeter of the first clutch member 210. In such an embodiment, the ribs 220 may, for example, be configured to be received within corresponding rib channels (e.g., as indicated by channel walls 222 shown in FIGS. 20 and 21) defined around the inner perimeter of the first roller 130. For instance, as shown in FIGS. 20 and 21, the first clutch member 210 may be configured to be pressed within the first roller 130 such that the ribs 220 are received within the interior rib channels 222 of the first roller 130, thereby rotationally engaging the first clutch member 210 with the first roller 130. However, it should be appreciated that, in other embodiments, the first clutch member 210 may be configured to be coupled to the first roller 130 for rotation therewith using any other suitable attachment configuration. Moreover, as shown in FIGS. 19-21, in one embodiment, the first clutch member 210 may also include peripheral flange 224 extending around the outer perimeter of the first clutch member 210 and configured to abut against the adjacent end 134 of the first roller 130 when the first clutch member 210 is fully installed within the roller 130.

Referring still to FIGS. 19-21, in several embodiments, the second clutch member 230 includes a generally cylindrical body 232 extending between a first axial end 234 of the second clutch member 230 and a second axial end 236 of the second clutch member 230. As indicated above, the second clutch member 230 may be configured to rotationally engage the first clutch member 210. In one embodiment, such rotational engagement between the first and second clutch members 210, 230 may be provided via an internal gear meshing arrangement. For instance, as particularly shown in FIG. 19, the second clutch member 230 includes a clutch gear portion 238 disposed at or adjacent to the first axial end 234 of the second clutch member 230, with the clutch gear portion 238 including a plurality of radially extending outer clutch gear teeth 240. In such an embodiment, as will be described below, when the second clutch member 230 is installed within the interior cavity 214 of the first clutch member 210, the outer clutch gear teeth 240 may be configured to rotationally engage corresponding inner clutch gear teeth 226 (FIGS. 19 and 20) extending radially inwardly within the interior cavity 214 of the first clutch member 210. Additionally, as will be described below, depending on the axial positioning of the second clutch member 230 relative to the first roller gear 162, the outer clutch gear teeth 240 may also be configured to selectively engage corresponding features of the first roller gear 162. Specifically, when the second clutch member 230 is in the engaged/first position (e.g., as shown in FIG. 20), the outer clutch gear teeth 240 may be configured to rotationally engage both the first clutch member 210 and the first roller gear 162. However, when the second clutch member 230 is moved to the disengaged/second position (e.g., as shown in FIG. 21), the outer clutch gear teeth 240 may be moved axially out of engagement with the first roller gear 162, thereby effectively disengaging the clutch assembly 200 from the drive arrangement 160.

As shown in FIGS. 19-21, the first roller gear 162 includes a generally cylindrical, hollow body 250 defining an interior gear cavity 252 extending axially between a first gear end 254 of the first roller gear 162 and a second gear end 256 of the first roller gear 162. In general, the interior gear cavity 252 may be configured to receive a portion of the second clutch member 230 when the roller gear 162 is installed relative to the clutch assembly 200. As indicated above, the first roller gear 162 may include suitable features for allowing the second clutch member 230 to be selectively engaged with the first roller gear 162 depending on the relative axial position of the second clutch member 230. For instance, in several embodiments, the first roller gear 162 may include axial projections 258 configured to selectively engage or otherwise interlock with the outer clutch gear teeth 240 of the second clutch member 230. For instance, as shown in FIG. 19, the axial projections 258 are configured to extend axially outwardly from the first gear end 254 of the first roller gear 162. Additionally, as shown in FIG. 19, the first roller gear 162 includes a drive gear portion 260 disposed at or adjacent to the second end 256 of the roller gear 162, with the drive gear portion 260 including a plurality of radially extending drive gear teeth 262. The drive gear teeth 262 may be configured to mesh with corresponding gear teeth of the adjacent gear of the drive arrangement 160 (FIG. 18) (e.g., gear teeth of the idler gear 166 shown in FIG. 18).

Moreover, in several embodiments, the clutch assembly 200 may also include a biasing element, such as a spring 270, configured to be positioned within the interior cavity 214 of the first clutch member 210 between the second clutch member 230 and the closed end 216 of the first clutch member 210. For instance, as shown in FIGS. 20 and 21, the spring 270 is configured to be compressed between an inner surface 271 of the first clutch member 210 defined at the closed end 216 of the first clutch member 210 and an inner surface 273 of an adjacent spring pocket 242 defined at the first axial end 234 of the second clutch member 230. As will be described below, the spring 270 may be configured to bias the second clutch member 230 into the engaged/first position such that the second clutch member 230 is normally engaged with both the first roller gear 162 and the first clutch member 210.

Referring specifically now to FIGS. 20 and 21, to assemble the clutch assembly 200, the spring 270 may be initially installed within the spring pocket 242 of the second clutch member 230. Thereafter, the first and second clutch members 210, 230 can be installed relative to each other. Specifically, in one embodiment, the first clutch member 210 may be installed axially over the second clutch member 230 such that first axial end 234 of the second clutch member 230 is received within the interior cavity 214 of the first clutch member 210 (e.g., via the open end 218 of the first clutch member 210). The clutch members 210, 230 may then be pressed axially together until the outer clutch gear teeth 240 of the second clutch member 230 engage with the inner clutch gear teeth 226 of the first clutch member 210. It should be appreciated that, if the outer clutch gear teeth 240 are not properly clocked relative to the inner clutch gear teeth 226, it may be necessary to slightly rotate the second clutch member 230 relative to the first clutch member 210 to ensure that the outer clutch gear teeth 240 are received within the circumferential gaps defined between the inner clutch gear teeth 226 as the second clutch member 230 is pushed axially within the first clutch member 210.

Additionally, the first roller gear 162 of the drive arrangement 160 may be installed relative to the assembled clutch members 210, 230 by inserting a portion of the first roller gear 162 axially within the interior cavity 214 of the first clutch member 210 via the open end 218 of the first clutch member 210. In one embodiment, the first roller gear 162 and/or the first clutch member 210 may include locking or retention features to assist in retaining the first roller gear 162 relative to the first clutch member 210 upon insertion of the first roller gear 162 within the interior cavity 214. For instance, as shown in the illustrated embodiment of FIGS. 19-21, the first roller gear 162 may include a locking ring 275 extending radially outwardly from the outer perimeter of the body 250 of the first roller gear 162 that is configured to engage with a corresponding locking ring 277 extending radially inwardly within the interior cavity 214 of the first clutch member 210. In such an embodiment, the first gear end 254 of the first roller gear 162 may be inserted within the interior cavity 214 of the first clutch member 210 until the locking ring 275 is pushed past the corresponding locking ring 277, thereby axially retaining the roller gear 162 relative to the first clutch member 210. Additionally, as particularly shown in FIG. 19, in one embodiment, the outer clutch gear teeth 240 of the second clutch member 230 may include chamfered ends 279 to allow for self-alignment between the outer clutch gear teeth 240 of the second clutch member 230 and the axial projections 258 of the first roller gear 162 as the first gear end 254 of the roller gear 162 is inserted within the interior cavity 214 of the first clutch member 210. It should be appreciated that, in one embodiment, the clutch assembly 200 and the first roller gear 162 may be pre-assembled as a unit for subsequent assembly within the associated covering.

As shown in FIGS. 20 and 21, with the first roller gear 162 installed relative to the first clutch member 210, the second clutch member 230 may extend at least partially through the interior gear cavity 252 defined by the first roller gear 162, thereby allowing the second axial end 236 of the second clutch member 230 to be accessible via the open end of the cavity 252 defined at the second gear end 256 of the first roller gear 162. As will be described below, such accessibility may allow a suitable tool 280 to be inserted through the interior gear cavity 252 and into a tool opening 244 defined in the second axial end 236 of the second clutch member 230 to allow the second clutch member 230 to be actuated or moved between its first and second positions and subsequently rotated to rotate the first roller 130 independent of the second roller 150.

Additionally, as indicated above and as shown in FIGS. 20 and 21, the clutch assembly 200 is also configured be installed relative to the first roller 130. Specifically, in several embodiments, the clutch assembly 200 may be configured to be inserted within the interior of the first roller 130 such that the first clutch member 210 rotationally engages the first roller 130. For example, in one embodiment, the clutch assembly 200 may be configured to be inserted within the interior of the first roller 130 until the radially outwardly projecting ribs 220 of the first clutch member 210 (indicated by the dashed lines in FIGS. 20 and 21) are received within the corresponding interior rib channels 222 of the first roller 130, thereby rotationally engaging the first clutch member 210 with the first roller 130. As shown in FIGS. 20 and 21, when the clutch assembly 200 has been fully inserted within the first roller 130, the outer peripheral flange 224 of the first clutch member 210 may, in one embodiment, abut against the adjacent end 134 of the first roller 130.

As indicated above, FIG. 20 illustrates a cross-sectional view of the clutch assembly 200 when the second clutch member 230 is disposed in the engaged or first axial position. As shown in FIG. 20, when in the engaged/first position, axial sections of the clutch gear portion 238 of the second clutch member 230 are biased into engagement with (or otherwise mesh with) both the inner clutch gear teeth 226 of the first clutch member 210 (e.g., across a first axial section 246) and the axial projections 258 of the first roller gear 162 (e.g., across a second axial section 248). Specifically, when in the engaged/first position, the second axial section 248 of the clutch gear portion 238 is positioned within the interior gear cavity 252 of the first roller gear 162 such that the clutch gear teeth 240 are axially engaged with the axial projections 248 of the first roller gear 162. As such, the second clutch member 230 serves to rotationally couple the first clutch member 210 to the first roller gear 162. Accordingly, since the first clutch member 210 is rotationally engaged with the first roller 130, the clutch assembly 200 functions as a rotational coupling between the first roller 130 and the drive arrangement 160 when the second clutch member 230 is disposed in the engaged/first position. Thus, rotation of either roller will be transmitted through both the drive arrangement 160 and clutch assembly 200 to the other roller, thereby allowing simultaneous rotation of both rollers 130, 150.

Additionally, as indicated above, FIG. 20 illustrates a cross-sectional view of the clutch assembly 200 after the second clutch member 230 has been moved from the engaged/first position to the disengaged/second position. As shown in FIG. 20, when in the disengaged/second position, the clutch gear portion 238 of the second clutch member 230 is only engaged with (or otherwise meshes with) the inner clutch gear teeth 226 of the first clutch member 210 (e.g., across axial section 249). Specifically, as shown by the difference in axial positioning of the second clutch member 230 between FIG. 20 and FIG. 21, when actuated from the engaged/first position to the disengaged/second position, the clutch gear portion 238 of the second clutch member 230 is moved axially beyond the first gear end 254 of the first roller gear 162 (e.g., to a location exterior of the interior gear cavity 252 of the first roller gear 162) and, thus, the outer clutch gear teeth 240 of the clutch gear portion 238 axially clear the axial projections 258 of the first roller gear 162, thereby rotationally disengaging the second clutch member 230 from the first roller gear 162. Accordingly, with the second clutch member 230 in the disengaged/second position, the first roller 130 is disengaged or decoupled from the drive arrangement 160. As a result, the rollers may be rotated independently of each other. Specifically, by disengaging the second clutch member 230 from the first roller gear 162, the first roller 130 may be rotated without transferring rotational motion to the second roller 150 via the drive arrangement 160. Similarly, since the first roller 130 is disengaged or decoupled from the drive arrangement 160, the second roller 150 may also be rotated independently without transferring rotational motion to the first roller 130.

As shown in FIGS. 20 and 21, given the positioning of the biasing spring 270, the second clutch member 230 is biased into the engaged/first position, thereby resulting in the clutch assembly 200 being normally configured to serve as a rotational coupling between the first roller 130 and the drive arrangement 160. In such an embodiment, to actuate or move the second clutch member 230 to the disengaged/second position, a suitable tool may be used to push or press the second clutch member 230 axially inwardly (i.e., toward the closed end of the first clutch member as indicated by arrow 282 in FIGS. 20 and 21) against the bias of the spring 270. For instance, as shown in FIGS. 20 and 21, a hand tool 280 grasped by a user may be inserted through the open second end 256 of the interior gear cavity 252 and into the tool opening 244 defined in the second axial end 236 of the second clutch member 230. The hand tool 280 may then be used to push or press the second clutch member 230 inwardly (e.g., in direction 282) against the bias of the spring 270 to the disengaged/second position. Upon pushing the second clutch member 230 to the disengaged/second position (and, thus, disengaging or decoupling the first roller 130 from the drive arrangement 160), the user may then independently rotate one of the rollers (e.g., the first roller 130), as desired.

It should be appreciated that, in embodiments in which the hand tool 280 is keyed to or is otherwise configured to rotationally engage the tool opening 244, the tool 280, itself, may be used to rotate the first roller 130 upon pushing the second clutch member 230 to the disengaged/second position. It should also be appreciated that, when the disclosed covering 100 includes endcaps 184, 186 configured to cover the ends of the rollers 130, 150 (and the drive arrangement 160), an opening maybe defined through the adjacent endcap to allow the hand tool 280 to be inserted therethrough. For instance, as shown in FIG. 18, a tool opening 189 is defined in the second endcap 186 that is configured to be aligned with the tool opening 244 defined in the second clutch member 230 when the endcap 186 is installed on the upper rail housing 172, thereby allowing the user to access/actuate the second clutch member 230 without removing the endcap 186.

Figure 22:
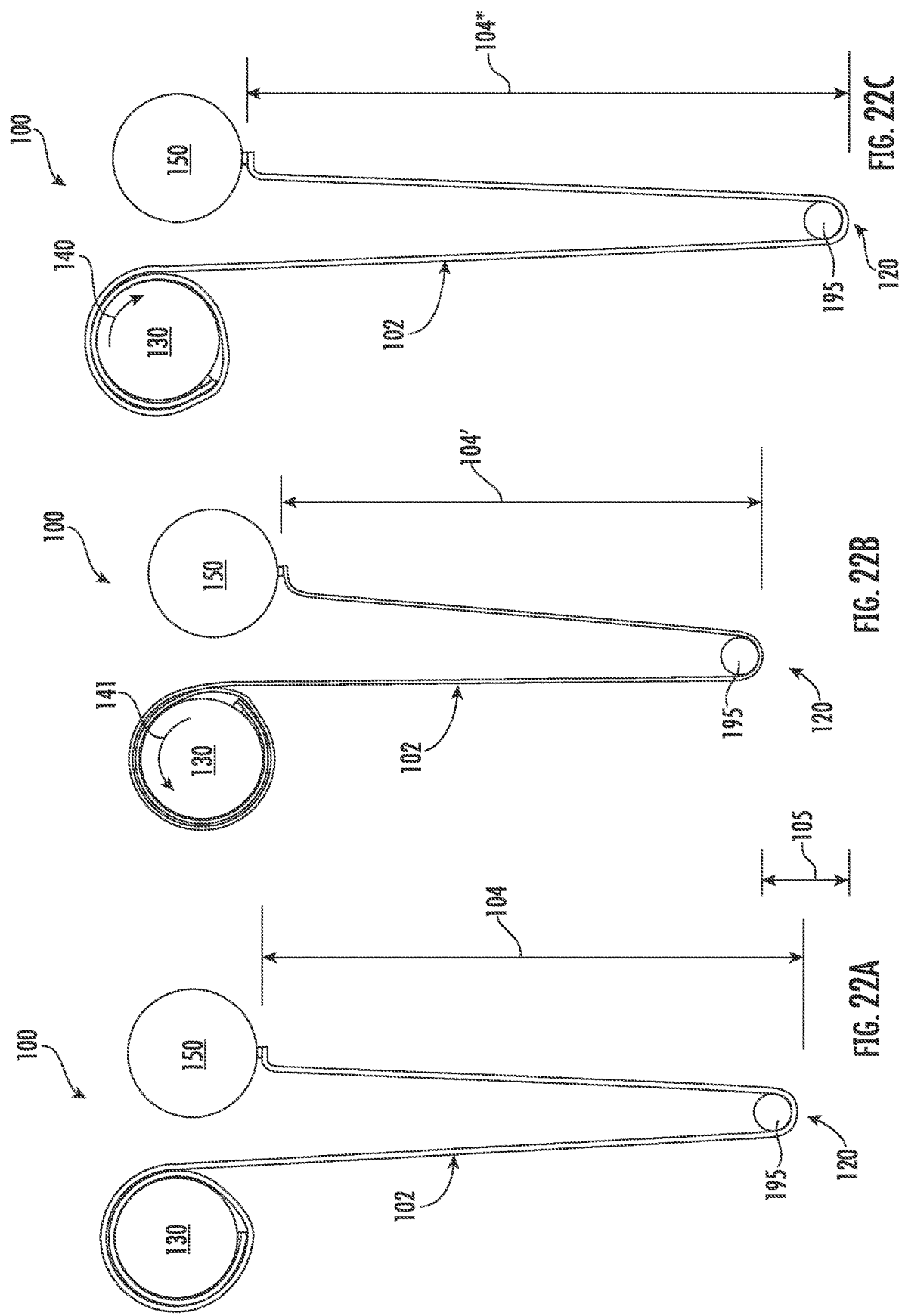
FIGS. 22A, 22B, and 22C illustrate simplified, cross-sectional views of one embodiment of the disclosed covering in accordance with aspects of the present disclosure, particularly illustrating examples of drop length adjustments that can be made by rotating one of the rollers of the covering relative to the other roller.

By providing the clutch assembly 200 described above or any other similar clutch-type mechanism that allows for one or both of the rollers 130, 150 to be disengaged or decoupled from the drive arrangement 160, one of the rollers may be rotated relative to the other roller to allow the drop length 104 of the covering 100 to be adjusted, as desired. For instance, FIGS. 22A-22C illustrate cross-sectional, simplified views of one embodiment of the covering 100 described above with reference to FIGS. 1 and 2, particularly showing various different drop lengths that can be achieved by rotating one of the rollers relative to the other while the shade 102 is in the extended position. Specifically, FIG. 22A illustrates the covering 100 in the state generally described above with reference to FIGS. 5, and 10, and 15, in which the shade 102 has initially reached its fully extended position such that the portion of the shade 102 previously wrapped around the second roller 150 has been completely unwound therefrom.

As shown in FIG. 22A, when moved to the fully extended position, the shade 102 may have an initial drop length 104. In many instances, the initial drop length 104 may correspond to the desired drop length and, thus, no drop length adjustments will be necessary. However, in certain instances, it may be desirable to slightly adjust the drop length 104, such as when the bottom of the shade 102 (or the bottom of the bottom rail assembly 190) does not reach the bottom of the associated architectural structure when fully extended (e.g., when the shade 102 or bottom rail assembly 190 does not reach the bottom of the associated window frame and, thus, a gap is created between the shade 102 (or the bottom rail assembly 190) and the window frame) or when the bottom of the shade (or the bottom of the bottom rail assembly 190) reaches the bottom of the associated architectural structure prior to the shade 102 being fully extended (e.g., when the shade 102 (or the bottom of the bottom rail assembly 190) bottoms out on the associated window frame prior to the shade 102 being fully extended, which results in the shade 102 becoming slack, bunched, or folded in the fully extended position). In such instances, the drop length 104 of the shade 102 may be adjusted to ensure that the covering 100 provides the desired coverage and/or aesthetics when in the fully extended position.

To make such drop length adjustments when the rollers 130, 150 are rotationally coupled together, the rollers 130, 150 must initially be decoupled from each other. For instance, using the clutch assembly 200 described above, the rollers 130, 150 may be decoupled from each other by moving the second clutch member 230 from its engaged/second position to its disengaged/second position (e.g., using the associated hand tool 280). One of the rollers may then be rotated relative to the other roller to adjust the drop length 104 of the shade 102. For example, in the illustrated examples of FIGS. 22A-22C, the first roller 130 is shown as being rotated relative to the second roller 150 to adjust the drop length 104. Specifically, as shown in FIG. 22B, by rotating the first roller 130 relative to the second roller in a first or winding direction (indicated by arrow 141), a portion of the shade 102 may be re-wound onto the roller 130, thereby shortening the drop length of the shade 102 from the initial drop length 104 of FIG. 22A to the shortened drop length 104' of FIG. 22B. Alternatively, as shown in FIG. 22C, by rotating the first roller 130 relative to the second roller 150 in an opposed second or unwinding direction (indicated by arrow 140), a portion of the shade 102 may be unwound from the roller 130, thereby increasing the drop length of the shade 102 from the initial drop length 104 of FIG. 22A to the increased drop length 104* of FIG. 22C. Such adjustability may allow for the drop length 104 to be adjusted across an adjustment range 105 (FIG. 22A) depending on the direction in which the first roller 130 is being rotated. Once the drop length 104 has been adjusted, as desired, the rollers 130, 150 may again be rotationally coupled to each other (e.g., by releasing the hand tool 280 to re-engage the clutch assembly 200), thereby allowing the shade 102 to function in the manner described above in which both rollers 130, 150 rotate simultaneously to adjust the shade configuration of the covering 100 and/or to move the shade 102 between the extended and retracted positions.

It should be appreciated that, in embodiments in which the rollers 130, 150 are not rotationally coupled to each other, the above-described drop length adjustments may be achieved without necessitating the clutch-type mechanism. For instance, in an embodiment in which each roller 130, 150 is configured to be independently driven by a separate drive source (e.g., separate electric motors), one of the rollers may be rotated relative to the other by simply activating or using the associated drive source to rotate such roller in a manner that allows for the drop length 104 of the shade 102 to be adjusted.

Figure 23:
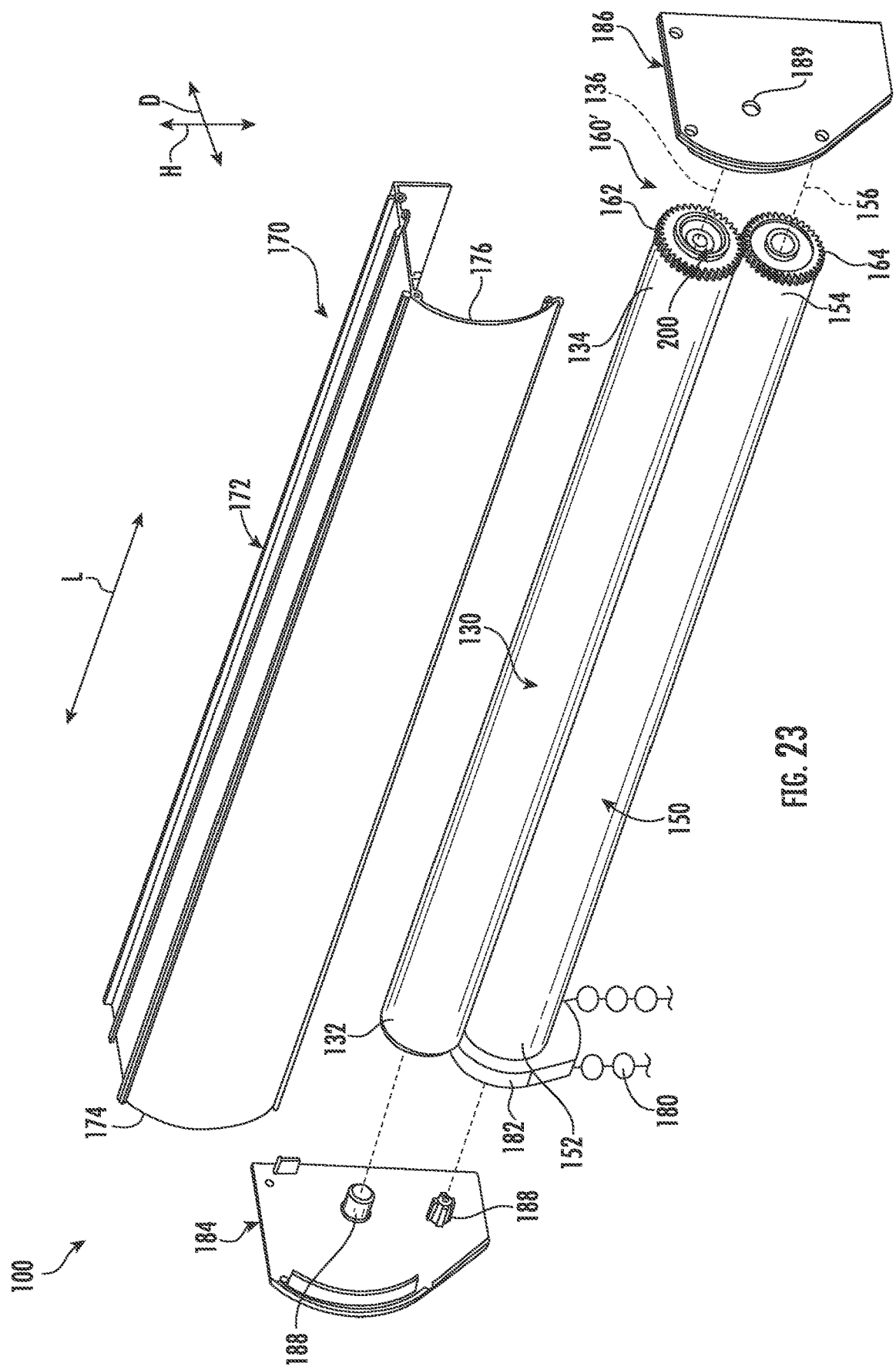
FIG. 23 illustrates an exploded, perspective view of an alternative embodiment of the portion of the covering shown in FIG. 18, particularly illustrating the use of a direct drive arrangement in accordance with aspects of the present disclosure.
Figure 24:
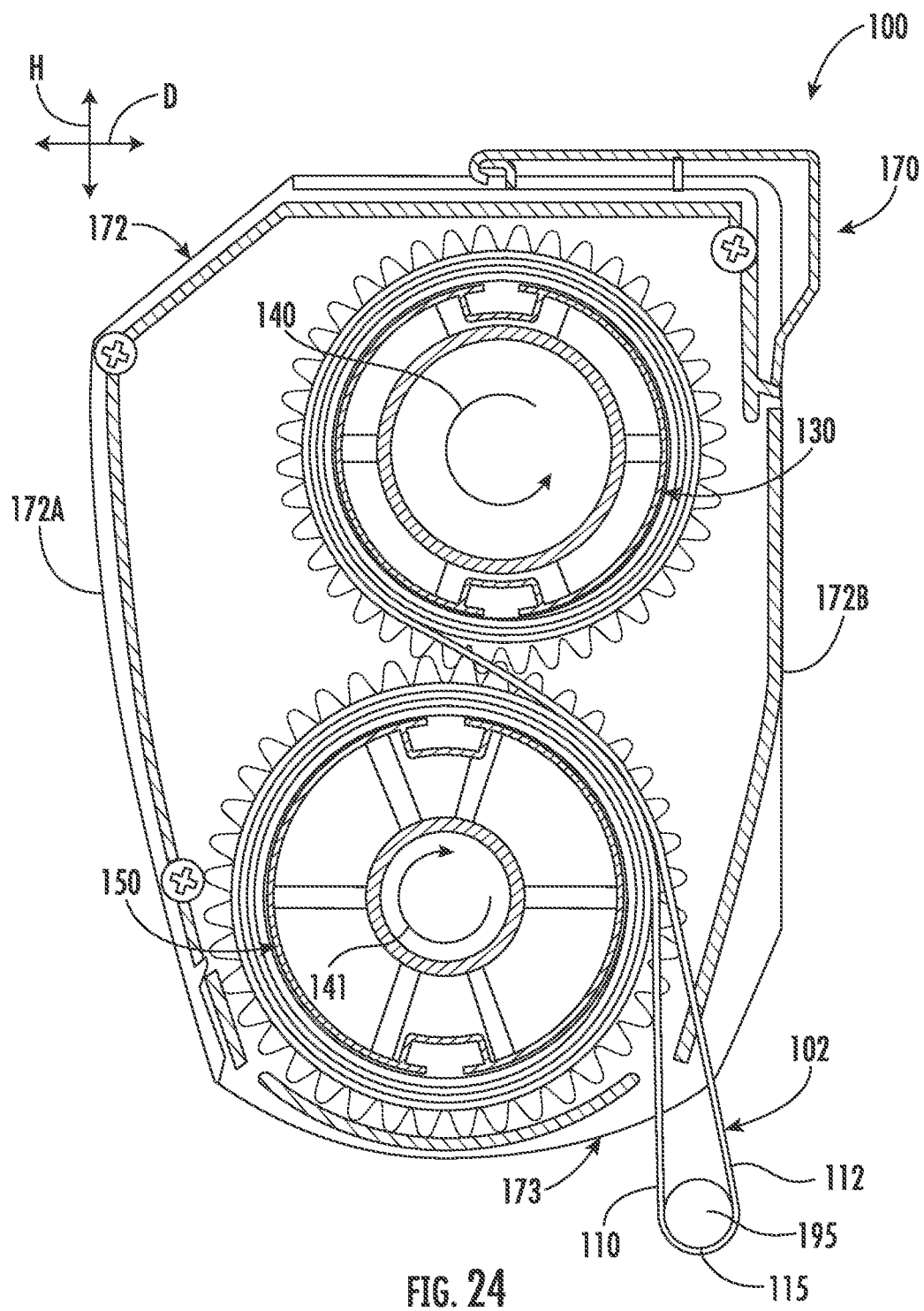
FIG. 24 illustrates an assembled, cross-sectional view of the portion of the covering shown in FIG. 23 with the shade installed relative to the rollers in accordance with aspects of the present subject matter.

Referring now to FIGS. 23 and 24, another embodiment of the headrail assembly 170 described above with reference to FIG. 18 is illustrated in accordance with aspects of the present subject matter. Specifically, FIG. 23 illustrates a perspective view of the rollers 130, 150 of the covering 100 shown in FIGS. 1 and 2, with the various components of the of the headrail assembly 170 (e.g., the upper rail housing 172 and the endcaps 184, 186) being exploded away from the rollers 130, 150 for purposes of illustration to show the relative positioning of the rollers 130, 150 when installed within the headrail assembly 170. Additionally, FIG. 24 illustrates a cross-sectional, assembled view of the components shown in FIG. 23 with the shade 102 being illustrated as installed relative to the rollers 130, 150 (with only the idling roller 195 being shown in FIG. 24 for purposes of illustration).

As particularly shown in FIG. 23, unlike the gear-based indirect drive arrangement 160 of embodiment shown in FIG. 18, the rollers 130, 150 are rotationally coupled to each other via a gear-based direct drive arrangement 160'. Specifically, as opposed to coupling the first and second roller gears 162, 164 together via the idler gear 166, the roller gears 162, 164 are configured to directly mesh with each other. As such, the rollers 130, 150 may be configured to rotate simultaneously, but in opposite rotational directions. For instance, when one of the rollers 130, 150 is rotationally driven via the associated drive mechanism of the covering 100 (e.g., the drive mechanism 182 provided at the first end 152 of the second roller 150), the first roller 130 will rotate in a first rotational direction while the second roller 150 rotates simultaneously in a second, opposite rotational direction. Additionally, as shown in FIG. 23, a clutch-type mechanism (e.g., clutch assembly 200) may be provided in operative association with one of the rollers 130, 150 (e.g., the first roller 130) to allow for rotation of one of the rollers 130, 150 relative to the other (e.g., to facilitate drop length adjustments for the shade 102).

It should be appreciated that, by coupling the rollers 130, 150 together via the direct drive arrangement 160', the rollers 130, 150 may be positioned closed together within the upper rail housing 172, thereby allowing the size of the housing 172 to be reduced (e.g., in the depthwise direction D and/or the heightwise direction H of the covering 100). For instance, as shown in FIG. 24, the first roller 130 may be positioned directly above and stacked tightly together with the second roller 150 in the heightwise direction H, thereby allowing the depth of the housing 172 in the depthwise direction D to be reduced, if desired. Additionally, as shown in FIG. 24, the first roller 130 may, in one embodiment, be positioned slightly aft or rearward of the second roller 150 in the depthwise direction D (e.g., relative to a forward face 172A of the upper rail housing 172), thereby allowing for a slight reduction in the height of the housing 172 in the heightwise direction H, if desired.

In several embodiments, by arranging the rollers 130, 150 relative to each other in the manner shown in FIG. 24, the rollers 130, 150 may be configured to unwind and re-wind the shade 102 along the same side of the upper rail housing 172 (e.g., along the rear side defined by a rear face 172B of the housing 172). Specifically, as shown in FIG. 24, when unwinding the shade 102 from the retracted position, the first roller 130 may be rotated in a first rotational direction (indicated by arrow 140) and the second roller 150 may be rotated in a second rotational direction (indicated by arrow 141) such that the portion of the shade 102 being unwound from the first roller 130 wraps over the top of the second roller 130 and contacts or rests on top of the portion of the shade 102 being unwound from the second roller 150. In this regard, the second roller 150 generally function as a kick-back roller within the upper rail housing 172. As such, the first and second sides 110, 112 (FIG. 24) of the shade 102 may generally extend downwardly from the upper rail housing 172 at a common exit point 173, thereby minimizing the depth of the shade 102 in the depthwise direction D. Moreover, given the vertically stacked arrangement of the rollers 130, 150 within the upper rail housing 172, a minimal depth change will occur following the shade 102 being fully unwound from the first roller 130 and as the shade 102 begins to be rewound around the first roller 130 with continued rotation thereof.

Figure 25:
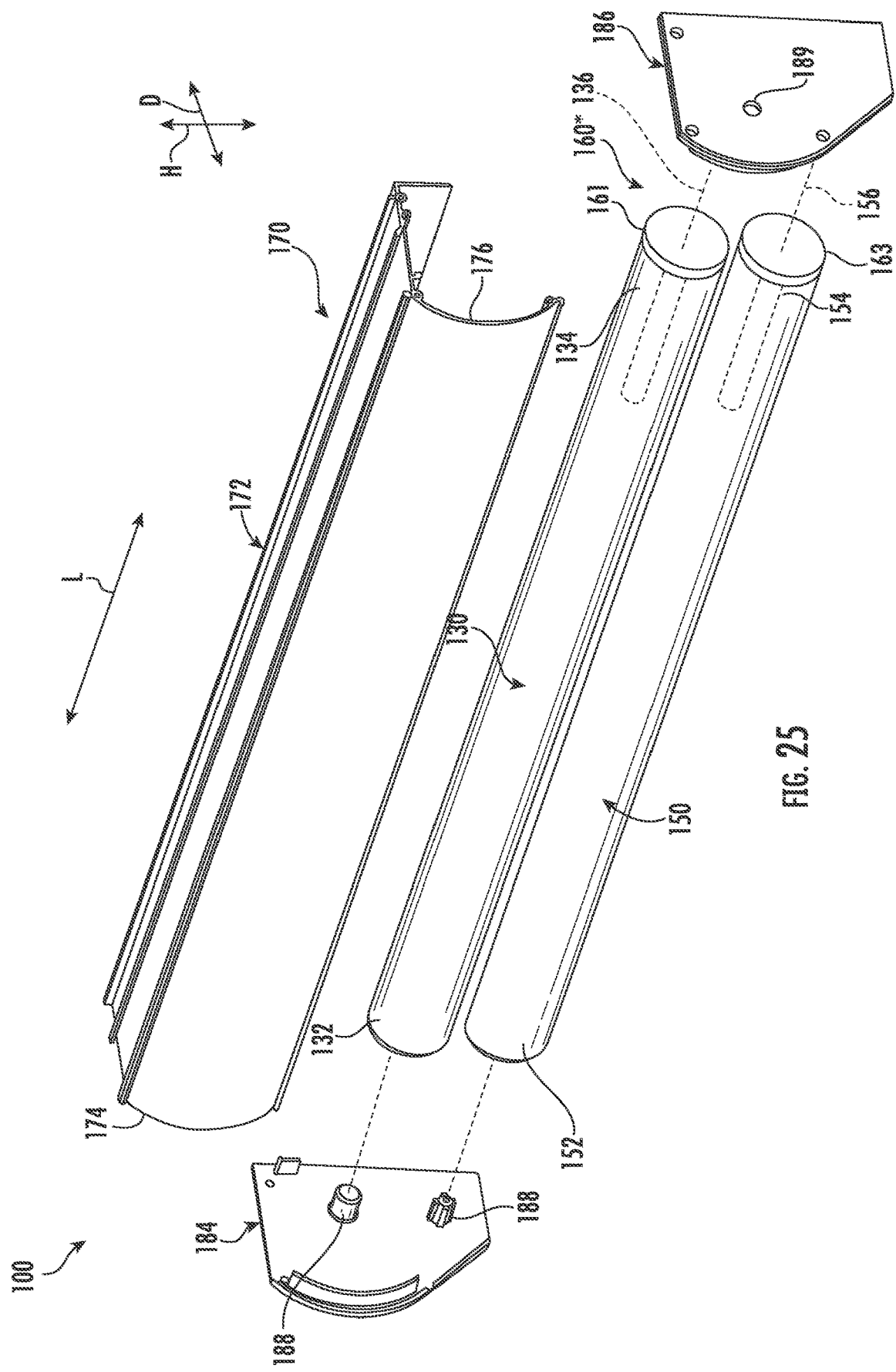
FIG. 25 illustrates an exploded, perspective view of yet another embodiment of the portion of the covering shown in FIG. 18, particularly illustrating the use of a motor-based drive arrangement for the covering in accordance with aspects of the present disclosure.

Referring now to FIG. 25, another embodiment of the headrail assembly 170 described above with reference to FIG. 18 is illustrated in accordance with aspects of the present subject matter. Specifically, FIG. 25 illustrates a perspective view of the rollers 130, 150 of the covering 100 shown in FIGS. 1 and 2, with the various components of the of the headrail assembly 170 (e.g., the upper rail housing 172 and the endcaps 184, 186) being exploded away from the rollers 130, 150 for purposes of illustration to show the relative positioning of the rollers 130, 150 when installed within the headrail assembly 170.

As shown in FIG. 25, unlike the embodiments described above in which the rollers 130, 150 are rotationally coupled together and driven via a common drive mechanism, each roller 130, 150 is, instead, configured to be independently driven via a separate drive mechanism. Specifically, in the illustrated embodiment, the rollers 130, 150 are provided in operative association with a motor-based drive arrangement 160*, with the drive arrangement 160* including a separate drive motor coupled to each roller 130, 150. For instance, as shown in FIG. 25, a first electric motor 161 is coupled to the first roller 130 and a second electric motor 163 is coupled to the second roller 150. In such an embodiment, the rollers 130, 150 may be simultaneously rotated (e.g., in the same direction or in opposite directions) by separately controlling the operation of each motor 161, 163, (e.g. by activating both motors 161, 163 at the same time to allow both rollers 130, 150 to be simultaneously driven). Additionally, as indicated above, it should be appreciated that, by using separate drive motors 161, 163, the rollers 130, 150 may be rotated independently (e.g., by simply activating one of the drive motors 161, 163) to facilitate drop length adjustments without requiring a clutch-type mechanism or any other suitable means for rotationally disengaging the rollers 130, 150.

While the foregoing Detailed Description and drawings represent various embodiments, it will be understood that various additions, modifications, and substitutions may be made therein without departing from the spirit and scope of the present disclosure. Each example is provided by way of explanation without intent to limit the broad concepts of the present disclosure. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present disclosure covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present disclosure. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present disclosure being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of the present disclosure. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present disclosure. These examples are not the only way to implement these principles but are merely examples. Thus, references to elements or structures or features in the drawings must be appreciated as references to examples of embodiments of the present disclosure, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A covering for an architectural structure, said covering comprising:
    a first roller;
    a second roller spaced apart from said first roller; and
    a multi-panel shade movable between a retracted position and an extended position with rotation of said first and second rollers, said multi-panel shade including a plurality of panel sections arranged relative to one another to form a continuous shade extending between a first end of said multi-panel shade coupled to said first roller and a second end of said multi-panel shade coupled to said second roller, with a looped end of said multi-panel shade being suspended below said first and second rollers when said multi-panel shade is in the extended position;
wherein:
said plurality of panel sections comprises a first panel section, a second panel section, and an intermediate panel section coupled end-to-end with said first and second panel sections such that a first end of said intermediate panel section is coupled to an adjacent end of said first panel section and a second end of said intermediate panel section is coupled to an adjacent end of said second panel section;
at least one of said first panel section, said second panel section, or said intermediate panel section exhibits a different shade property than another of said plurality of panel sections;
when said multi-panel shade is in the extended position with portions of said first panel section, said second panel section, and said intermediate panel section exposed along a drop length of said covering, said covering provides a hybrid shade configuration in which a first vertical portion of said multi-panel shade extending along an upper vertical portion of said drop length has a first shade configuration and a second vertical portion of said multi-panel shade extending along a lower vertical portion of said drop length has a second shade configuration that differs from the first shade configuration;
each of said first panel section, said second panel section, and said intermediate panel section has a length that is substantially equal to said drop length of said covering;
the first shade configuration is defined by a dominant light transmission characteristic of portions of said first and second panel sections extending across said upper vertical portion of said drop length;
the second shade configuration is defined by a light transmission characteristic of portions of said intermediate panel section extending across said lower vertical portion of said drop length, said second shade configuration comprising one of a light-filtering shade configuration or a room darkening shade configuration;
said first and second rollers are coupled together via a drive arrangement such that rotation of said first roller results in simultaneous rotation of said second roller, and further comprising a clutch assembly configured to disengage one of said first roller or said second roller from said drive arrangement to allow said one of said first roller or said second roller to rotate relative to a second of said first roller or said second roller; and
said clutch assembly is configured to disengage said first roller from said first drive gear to allow said first roller to be rotated relative to said second roller, said clutch assembly comprising a first clutch member coupled to said first roller for rotation therewith about the first axis of rotation and a second clutch member movable relative to said first clutch member between a first position and a second position, and said first clutch member defining an interior cavity that receives portions of both said second clutch member and said first drive gear.

2. The covering of claim 1, wherein said first shade configuration comprises one of a transparent shade configuration or a sheer shade configuration.

3. The covering of claim 1, wherein the first shade configuration comprises a different one of the light-filtering shade configuration or the room darkening shade configuration compared to said second shade configuration.

4. The covering of claim 1, wherein a material of a shade web forming at least one of said first panel section or said second panel section is selected to provide the first shade configuration and a material of a shade web forming said intermediate panel section is selected to provide the second shade configuration.

5. The covering of claim 1, wherein:
said upper vertical portion has an upper vertical height and said lower vertical portion has a lower vertical height; and
a summation of said upper and lower vertical heights is equal to said drop length.

6. The covering of claim 1, wherein said looped end of said multi-panel shade is looped around an idling roller suspended below said first and second rollers when said multi-panel shade is in the extended position such that the multi-panel shade includes a first side extending between said first roller and said looped end and a second side extending between said second roller and said looped end.

7. The covering of claim 6, wherein said covering provides said hybrid shade configuration when said intermediate panel section loops around said idling roller from said first side of said multi-panel shade to said second side of said multi-panel shade such that said lower vertical portion of said multi-panel shade comprises a portion of said drop length along which portions of said intermediate panel section extend across said first and second sides of said multi-panel shade.

8. The covering of claim 1, wherein:
said drive arrangement comprises a first roller gear provided in operative association with said first roller and a second roller gear provided in operative association with said second roller; and
said first and second roller gears are coupled to each other to transfer rotation between said first and second rollers.

9. A covering for an architectural structure, said covering comprising:
a first roller;
a second roller spaced apart from said first roller;
a drive arrangement comprising a first drive member coupled with said first roller and a second drive member coupled with said second roller, said first and second drive members rotationally engaging each other to couple said first and second rollers together such that rotation of said first roller results in simultaneous rotation of said second roller;
a clutch assembly provided in operative association with said drive arrangement, said clutch assembly comprising a first clutch member, a second clutch member, and a biasing element that applies a biasing force against the second clutch member, said first clutch member defining an interior cavity that receives portions of both said second clutch member and said first drive member; and
a shade configured to be moved between a retracted position and an extended position with rotation of said first and second rollers;
wherein axial movement of the second clutch member of said clutch assembly against the biasing force of the biasing element is configured to disengage said first drive member from said first roller to allow one of said first roller or said second roller to be rotated relative to a second of said first roller or said second roller while said first and second drive members remain rotationally engaged.

10. A drive system for a covering, the drive system comprising:
- a first roller rotatable about a first axis of rotation;
- a second roller rotatable about a second axis of rotation spaced apart from the first axis of rotation;
- a drive arrangement comprising a first drive gear coupled with said first roller and a second drive gear coupled with said second roller, said first and second drive gears rotationally engaging each other to couple said first and second rollers together such that rotation of said first roller results in simultaneous rotation of said second roller; and
- a clutch assembly provided in operative association with said drive arrangement, said clutch assembly being configured to disengage said first roller from said first drive gear to allow said first roller to be rotated relative to said second roller, said clutch assembly comprising:
  - a first clutch member coupled to said first roller for rotation therewith about the first axis of rotation; and
  - a second clutch member movable relative to said first clutch member between a first position and a second position;

wherein:
- said first clutch member defines an interior cavity that receives portions of both said second clutch member and said first drive gear;
- when said second clutch member is in the first position, said clutch assembly provides a rotational coupling between said first roller and said first drive gear such that rotational motion is transmitted between said first roller and said drive arrangement via said clutch assembly to allow simultaneous rotation of said first and second rollers; and
- when said second clutch member is moved from the first position to the second position, said first roller is decoupled from said first drive gear to allow rotation of said first roller relative to said second roller.

11. The drive system of claim 10, wherein said second clutch member is movable axially along said first axis of rotation between the first and second positions.

12. The drive system of claim 10, wherein said second clutch member is configured to rotationally engage both said first clutch member and said first drive gear when said second clutch member is in the first position.

13. The drive system of claim 12, wherein, when said second clutch member is moved axially relative to said first clutch member and said first drive gear from the first position to the second position, said second clutch member remains rotationally engaged with said first clutch member and is rotationally decoupled from said first drive gear.

14. The drive system of claim 12, wherein the second clutch member comprises engagement features configured to axially overlap and rotationally engage with corresponding engagement features of both said first clutch member and said first drive gear when said second clutch member is in the first position.

15. The drive system of claim 10, wherein, when said second clutch member is in the first position, said second clutch member is engaged with said first drive gear within said interior cavity.

* * * * *